United States Patent
Clary et al.

(10) Patent No.: US 7,639,876 B2
(45) Date of Patent: Dec. 29, 2009

(54) SYSTEM AND METHOD FOR ASSOCIATING HANDWRITTEN INFORMATION WITH ONE OR MORE OBJECTS

(75) Inventors: Gregory James Clary, Cary, NC (US); Jason S. Priebe, Raleigh, NC (US); Todd Andrew Eiles, Raleigh, NC (US); Christopher M. DiPierro, Durham, NC (US); Richard L. Thornburg, Topeka, KS (US); Michael Earl Miller, Perry, KS (US)

(73) Assignees: Advanced Digital Systems, Inc., Research Triangle Park, NC (US); Cardinal Brands, Inc., Topeka, KS (US)

( * ) Notice: Subject to any disclaimer, the term of this patent is extended or adjusted under 35 U.S.C. 154(b) by 653 days.

(21) Appl. No.: 11/036,534

(22) Filed: Jan. 14, 2005

(65) Prior Publication Data

US 2006/0159345 A1 Jul. 20, 2006

(51) Int. Cl.
*G06K 9/18* (2006.01)
(52) U.S. Cl. .................. 382/186; 382/185; 382/190
(58) Field of Classification Search ............... 382/186, 382/185, 190
See application file for complete search history.

(56) References Cited

U.S. PATENT DOCUMENTS

| | | |
|---|---|---|
| 4,731,857 A | 3/1988 | Tappert |
| 4,793,810 A | 12/1988 | Beasley, Jr. |
| D308,364 S | 6/1990 | Beasley, Jr. et al. |
| RE33,498 E | 12/1990 | Proulx et al. |
| 5,008,948 A | 4/1991 | Tsukawaki |
| 5,060,980 A | 10/1991 | Johnson et al. |
| 5,063,600 A | 11/1991 | Norwood |
| 5,113,041 A | 5/1992 | Blonder et al. |
| 5,187,774 A | 2/1993 | Ericson |
| 5,243,149 A | 9/1993 | Comerford et al. |
| RE34,476 E | 12/1993 | Norwood |

(Continued)

FOREIGN PATENT DOCUMENTS

WO WO 01/16691 3/2001
WO WO 01/25891 4/2001

OTHER PUBLICATIONS

U.S. Appl. No. 09/540,469, filed Mar. 31, 2000, McMaster et al.

(Continued)

*Primary Examiner*—Anand Bhatnagar
*Assistant Examiner*—Mike Rahmjoo
(74) *Attorney, Agent, or Firm*—Alston & Bird LLP

(57) ABSTRACT

A pen-enabled computing arrangement includes a handwriting capture interface and at least one processing element, such as in the form of a computing system and a digital pen that embodies a writing stylus. The handwriting capture interface can capture an electronic handwriting input. The processing element can sense an identifier associated with an object, and associate electronic handwriting input with the object. The processing element can then process the electronic handwriting input based upon the associated object. Printed paper with which the arrangement can operate to effectuate capturing and processing data may also be provided. Further, triggered verification of the sensed identifier may be provided when the identifier is sensed based upon initial electronic handwriting input corresponding to the identifier and the sensed identifier is unknown and/or improper.

30 Claims, 18 Drawing Sheets

U.S. PATENT DOCUMENTS

| | | | |
|---|---|---|---|
| 5,287,417 A | 2/1994 | Eller et al. |
| 5,313,527 A | 5/1994 | Guberman et al. |
| 5,347,477 A | 9/1994 | Lee |
| 5,392,390 A | 2/1995 | Crozier |
| 5,455,901 A | 10/1995 | Friend et al. |
| 5,459,796 A | 10/1995 | Boyer |
| 5,463,696 A | 10/1995 | Beernink et al. |
| 5,465,325 A | 11/1995 | Capps et al. |
| 5,493,692 A | 2/1996 | Theimer et al. |
| 5,528,154 A | 6/1996 | Leichner et al. |
| 5,544,295 A | 8/1996 | Capps |
| 5,544,321 A | 8/1996 | Theimer et al. |
| 5,555,376 A | 9/1996 | Theimer et al. |
| 5,559,942 A | 9/1996 | Gough et al. |
| 5,561,446 A | 10/1996 | Montlick |
| 5,577,135 A | 11/1996 | Grajski et al. |
| 5,583,543 A | 12/1996 | Takahashi et al. |
| 5,587,560 A | 12/1996 | Crooks et al. |
| 5,596,694 A | 1/1997 | Capps |
| 5,600,735 A | 2/1997 | Seybold |
| 5,603,054 A | 2/1997 | Theimer et al. |
| 5,611,050 A | 3/1997 | Theimer et al. |
| 5,625,833 A | 4/1997 | Levine et al. |
| 5,627,349 A | 5/1997 | Shetye et al. |
| 5,629,499 A | 5/1997 | Flickinger et al. |
| 5,652,412 A | 7/1997 | Lazzouni et al. |
| 5,661,506 A | 8/1997 | Lazzouni et al. |
| 5,666,530 A | 9/1997 | Clark et al. |
| 5,680,636 A | 10/1997 | Levine et al. |
| 5,682,439 A | 10/1997 | Beernink et al. |
| 5,704,029 A | 12/1997 | Wright, Jr. |
| 5,737,443 A | 4/1998 | Guzik et al. |
| 5,737,740 A | 4/1998 | Henderson et al. |
| 5,740,273 A | 4/1998 | Parthasarathy et al. |
| 5,742,705 A | 4/1998 | Parthasarathy |
| 5,751,851 A | 5/1998 | Guzik et al. |
| 5,787,312 A | 7/1998 | Suzuki |
| 5,797,089 A | 8/1998 | Nguyen |
| 5,812,865 A | 9/1998 | Theimer et al. |
| 5,813,771 A | 9/1998 | Ur et al. |
| 5,818,425 A | 10/1998 | Want et al. |
| 5,838,819 A | 11/1998 | Ruedisueli et al. |
| 5,850,214 A | 12/1998 | McNally et al. |
| 5,898,156 A | 4/1999 | Wilfong |
| 5,900,943 A | 5/1999 | Owen |
| 5,903,666 A | 5/1999 | Guzik et al. |
| 5,921,582 A | 7/1999 | Gusack |
| 5,930,380 A | 7/1999 | Kashi et al. |
| 5,943,137 A | 8/1999 | Larson et al. |
| 5,986,568 A | 11/1999 | Suzuki et al. |
| 6,005,973 A | 12/1999 | Seybold et al. |
| 6,012,073 A | 1/2000 | Arend et al. |
| 6,018,591 A | 1/2000 | Hull et al. |
| 6,050,490 A | 4/2000 | Leichner et al. |
| 6,055,333 A | 4/2000 | Guzik et al. |
| 6,055,552 A | 4/2000 | Curry |
| 6,128,006 A | 10/2000 | Rosenberg et al. |
| 6,141,570 A | 10/2000 | O'Neill et al. |
| 6,144,371 A | 11/2000 | Clary et al. |
| 6,144,764 A | 11/2000 | Yamakawa et al. |
| 6,151,611 A | 11/2000 | Siegel |
| 6,153,836 A | 11/2000 | Goszyk |
| 6,219,731 B1 | 4/2001 | Gutowitz |
| 6,259,043 B1 | 7/2001 | Clary et al. |
| 6,272,506 B1 | 8/2001 | Bell |
| 6,295,372 B1 | 9/2001 | Hawkins et al. |
| 6,304,898 B1 | 10/2001 | Shiigi |
| 6,311,042 B1 | 10/2001 | DeSchrijver |
| 6,323,803 B1 | 11/2001 | Jolley et al. |
| 6,330,976 B1 | 12/2001 | Dymetman et al. |
| 6,333,994 B1 | 12/2001 | Perrone et al. |
| 6,374,259 B1 | 4/2002 | Celik |
| 6,384,848 B1 | 5/2002 | Kojima et al. |
| 6,396,481 B1 | 5/2002 | Challa et al. |
| 6,408,178 B1 | 6/2002 | Wickstrom et al. |
| 6,424,426 B1 | 7/2002 | Henry |
| 6,431,439 B1 | 8/2002 | Suer et al. |
| 6,445,468 B1 | 9/2002 | Tsai |
| 6,456,740 B1 | 9/2002 | Carini et al. |
| 6,463,413 B1 | 10/2002 | Applebaum et al. |
| 6,548,768 B1 | 4/2003 | Pettersson et al. |
| 6,553,131 B1 | 4/2003 | Neubauer et al. |
| 6,564,249 B2 | 5/2003 | Shiigi |
| 6,592,039 B1 | 7/2003 | Smith et al. |
| 6,615,183 B1 | 9/2003 | Kolls |
| 6,622,128 B1 | 9/2003 | Bedell et al. |
| 6,644,764 B2 | 11/2003 | Stephens, Jr. |
| 6,651,894 B2 | 11/2003 | Nimura et al. |
| 6,654,768 B2 | 11/2003 | Celik |
| 6,655,586 B1 | 12/2003 | Back et al. |
| 6,663,008 B1 | 12/2003 | Pettersson et al. |
| 6,671,403 B1 | 12/2003 | Takasu et al. |
| 6,678,864 B1 | 1/2004 | Tsai |
| 6,681,045 B1 | 1/2004 | Lapstun et al. |
| 6,689,966 B2 | 2/2004 | Wiebe |
| 6,698,660 B2 | 3/2004 | Fahraeus et al. |
| 6,718,061 B2 | 4/2004 | Lapstun et al. |
| 6,719,470 B2 | 4/2004 | Berhin |
| 6,720,985 B1 | 4/2004 | Silverbrook et al. |
| 6,722,574 B2 | 4/2004 | Skantze et al. |
| 6,732,927 B2 | 5/2004 | Olsson et al. |
| 6,741,749 B2 | 5/2004 | Herbert, Jr. |
| 6,755,129 B2 | 6/2004 | Schneider et al. |
| 6,798,907 B1 | 9/2004 | Clary et al. |
| 6,826,551 B1 | 11/2004 | Clary et al. |
| 6,836,555 B2 | 12/2004 | Ericson et al. |
| 6,912,308 B2 | 6/2005 | Reintjes et al. |
| 7,091,959 B1 | 8/2006 | Clary |
| 7,134,606 B2 | 11/2006 | Chou |
| 7,231,594 B1 | 6/2007 | Hitchcock et al. |
| 2001/0016856 A1 | 8/2001 | Tsuji et al. |
| 2001/0038383 A1 | 11/2001 | Ericson et al. |
| 2001/0038711 A1 | 11/2001 | Williams et al. |
| 2002/0011989 A1 | 1/2002 | Ericson et al. |
| 2002/0044134 A1 | 4/2002 | Ericson et al. |
| 2002/0050982 A1 | 5/2002 | Ericson |
| 2002/0056576 A1 | 5/2002 | Ericson |
| 2002/0059367 A1 | 5/2002 | Romero et al. |
| 2002/0107885 A1 | 8/2002 | Brooks et al. |
| 2003/0061188 A1 | 3/2003 | Wiebe et al. |
| 2003/0066896 A1 | 4/2003 | Pettersson et al. |
| 2004/0036681 A1 | 2/2004 | Kluttz et al. |
| 2004/0095337 A1 | 5/2004 | Pettersson et al. |
| 2004/0113898 A1 | 6/2004 | Pettersson et al. |
| 2004/0196473 A1 | 10/2004 | Silverbrook et al. |
| 2004/0201602 A1 | 10/2004 | Mody et al. |
| 2004/0236741 A1 | 11/2004 | Burstrom et al. |
| 2005/0243369 A1* | 11/2005 | Goldstein et al. ......... 358/1.18 |

OTHER PUBLICATIONS

Website: info@anoto.com; http://www.anoto.com/main.asp, dated Jul. 26, 2000, 16 total pp., Copyright 2000.

Website: Ecrio, Inc.; *Welcome to ecrio.com, Ecrio, Inc.* (visited Dec. 21, 2000) <http://www.ecrio.com>, 10 total selected pages.

Website: Ecrio, Inc., *Ecrio White Paper* (visited Dec. 21, 2000) <http://www.ecrio.com/products/p_htm>, 10 total pages.

Website: Ecritek Corp., *About Ecritek Corporation* (visited Jun. 26, 2000) <http://www.ecritek.com/company/company.html>, 54 total pages.

Website: Anoto AB, *Anoto—join the revolution* (visited Dec. 21, 2000) <http://www.anoto.com>, 29 total selected pages.

Website: Anoto, AB, *Anoton—Home* (visited Jul. 26, 2000) <http://www.anoto.com/main.asp>, 16 total pages.

Anoto, AB, *A comparison of Anoto Technology with Other Relevant Systems, available at* (visited Dec. 21, 2000) <http://www.anoto.com/pressroom/bin/comparison.pdf>, 17 total pages.

Anoto, AB, *Technical Brochure, available at* (visited Dec. 21, 2000) <http://www.anoto.com/pressroom/bin/technical_brochure.pdf>, 16 total pages.

Anoto, AB, *Anoto Pen, available at* (visited Dec. 21, 2000) <http://www.anoto.com/pressroom/bin/anoto_pen.pdf>, 1 total pages.

Anoto, AB, *Applications Illustrations, available at* (visited Dec. 21, 2000) <http://www.anoto.com/pressroom/bin/Applications_illus.pdf>, 1 total page.

Website: Seiko Instruments USA Inc., *Seiko Instruments—Business and Home Office Products Division* (visited Dec. 21, 2000) <http://www.seikosmart.com>, 7 total pages.

Website: Electric Pocket Limited, BugMe.net: *Yellow Stickies for Your Palm OS Handheld!* (visited Dec. 21, 2000) <http://www.bugme.net>, 15 total selected pages.

Electric Pocket Limited, *BugMe! User Guide, available at* (last modified Feb. 13, 2001) <http://www.bugme.net/BugMe.pdf>, 7 total pages.

Electric Pocket Limited, *BugMe! Messenger User Guide, available at* (last modified Feb. 13, 2001) <http://www.bugme.net/BugMeMessenger.pdf>, 8 total pages.

Electric Pocket Limited, *BugMe! For Palm OS* (acquired Dec. 21, 2000), 4 total pages.

Nathan et al., "Real-Time On-Line Unconstrained Handwriting Recognition Using Statistical Methods", 1995 Intl Conference on Acoustics, Speech and Signal Processing, May 1995, vol. 4, pp. 2619-2622.

Nosary et al., "A Step Towards The Use of Writer's Properties For Text Recognition", IEE Third European Workshop on Handwriting Analysis and Recognition, Jul. 1998, pp. 16/1-16/6.

Elliman et al., "The Use of Extended Trigrams for Contextual Word Recogniton", IEE Workshop on Handwriting Analysis and Recognition-A European Perspective, May 1996, pp. 10/1-10/.

Downton et al., "Lazy Evaluation for Best-First Contextual Handwriting Recognition", Proceedings of the 5th Intl Conference on Document Analysis and Recognition, Sep. 1999, pp. 589-592.

Amano et al., "DRS: A Workstation-Based Document Recognition System for Text Entry", Computer, Jul. 1992, vol. 25, Iss 7, pp. 67-71.

Du et al., "Computationally Efficient Contextual Processing for Handwritten Forms", IEE Workshop on Handwriting Analysis an Recognition-A European Perspective, May 1996, pp. 8/1-8/5.

Downton et al., "Visual Programming Paradigms for Handwriting Applications", IEE European Workshop on Handwriting Analysis and Recognition: A European Perspective, Jul. 1994, pp. 21/1-21/8.

Pavlidis et al., "Off-Line Recognition of Signatures Using Revolving Active Deformable Models", 1994 IEEE International Conference on Systems, Man and Cybernetics, Oct. 1994, vol. 1, pp. 771-776.

Kim et al., "Handwritten Word Recognition for Real-Time Applications", Proceedings of the 3rd International Conference on Document Analysis and Recognition, Aug. 1995, vol. 1, pp. 24-27.

Munich et al., "Visual Input for Pen-Based Computers", Proceedings of the 13th Infl Conference on Pattern Recognition, Aug. 1996, vol. 3, pp. 33-37.

Smithies, CPK, "The Handwritten Signature in Pen Computing", IEE Colloquium on handwriting and Pen-Based Input, 1994, pp. 2/1-2/3.

Beigi et al., "Size Normalizaiton in On-Line Unconstrained Handwriting Recognition", IEEE International Conference on Image Processing, Nov. 1994, vol. 1, pp. 169-173.

Jeremy M. Heiner, Scott E. Hudson, Kenichiro Tanaka; Linking and Messaging from Real Paper in the Paper PDA; *Proceedings of the 12.sup.th Annual ACM Symposium on User Interface Software and Technology Online*!Nov. 1999; pp. 179-186; vol. 1, No. 1; XP002177313; Asheville, North Carolina, USA; Retrived from the Internet: <URL:http://www.acm.org/pubs/citations/proceedings/uist/320719/ p179-heiner> (retrieved on Sep. 6, 2001).

Patent Cooperation Treaty—Notification of Transmittal of the International Search Report or the Declaration; International Searching Authority; regarding PCT / US 01/14009, fled May 1, 2001; mailed Sep. 26, 2001; Application Advanced Digital Systems, Inc.

Matic, N., *Pen-Based Visitor Registration System (Penguin)*, IEEE, 1058-6393/95, 1995, pp. 298-302.

* cited by examiner

_114_

116

118

120

Page 1

Protocol Code   Subject Initials   Subject Number   Visit Date
                                                    day  month  year Informed Consent / Inclusion / Exclusion Criteria
Screening Visit (Study Entry)

Has the patient signed an informed consent?  — 122        Yes O   No O
                                              — 122  124 —

Did the subject meet all entry criteria?                   Yes O   No O

Mark all bubbles that represent a violation of the inclusion/exclusion criteria:

Inclusion Criteria:

1. O   2. O   3. O   4. O   5. O

Exclusion Criteria:

1. O   2. O   3. O   4. O   5. O   6. O   7. O

174

Comments

REPORT OF MEDICAL HISTORY

DATE OF EXAM: 1-22-2002

NOTE: This information is for official and medically confidential use only and will not be released to unauthorized persons

1. NAME OF PATIENT (Last, first, middle): John Doe
2. IDENTIFICATION NUMBER: 6 2 9 9 3 4 5 1 1
3. GRADE: 76
4a. HOME ADDRESS (Street or RFD; City or Town; State; and ZIP Code): 143 West St.
5. EXAMINING FACILITY: RDU-001
4b. CITY: Raleigh 4c. STATE: NC 4d. ZIP CODE: 27604
6. PURPOSE OF EXAMINATION: routine examination

7. STATEMENT OF PATIENT'S PRESENT HEALTH AND MEDICATIONS CURRENTLY USED (Use additional pages if necessary)

| a. PRESENT HEALTH | b. CURRENT MEDICATION | REGULAR OR INTERIM |
|---|---|---|
| good | n/a | | c. ALLERGIES (Include insect bites/stings and common foods): n/a
d. HEIGHT: 5 FT 10 IN
e. WEIGHT: 170 POUNDS
8. PATIENT'S OCCUPATION: Software engineer
9. ARE YOU (Check one): ● RIGHT-HANDED ○ LEFT-HANDED

10. PAST/CURRENT MEDICAL HISTORY

| CHECK EACH ITEM | YES | NO | DON'T KNOW | CHECK EACH ITEM | YES | NO | DON'T KNOW | CHECK EACH ITEM | YES | NO | DON'T KNOW |
|---|---|---|---|---|---|---|---|---|---|---|---|
| Household contact with anyone with tuberculosis | ○ | ✓ | ○ | Shortness of breath | ○ | ✓ | ○ | Bone, joint, or other deformity | ○ | ✓ | ○ |
| Tuberculosis or positive TB test | ○ | ✓ | ○ | Pain or pressure in chest | ○ | ✓ | ○ | Loss of finger or toe | ○ | ✓ | ○ |
| Blood in sputum or when coughing | ○ | ✓ | ○ | Chronic cough | ○ | ✓ | ○ | Painful or "trick" shoulder or elbow | ○ | ✓ | ○ |
| Excessive bleeding after injury or dental work | ○ | ✓ | ○ | Palpitation or pounding heart | ○ | ✓ | ○ | Recurrent back pain or any back injury | ○ | ✓ | ○ |
| Suicide attempt or plans | ○ | ✓ | ○ | Heart trouble | ○ | ✓ | ○ | "Trick" or locked knee | ○ | ✓ | ○ |
| Sleepwalking | ○ | ✓ | ○ | High or low blood pressure | ○ | ✓ | ○ | Foot trouble | ○ | ✓ | ○ |
| Wear corrective lenses | ○ | ✓ | ○ | Cramps in your legs | ○ | ✓ | ○ | Nerve injury | ○ | ✓ | ○ |
| Eye surgery to correct vision | ○ | ✓ | ○ | Frequent indigestion | ○ | ✓ | ○ | Paralysis (include infantile) | ○ | ✓ | ○ |
| Lack vision in either eye | ○ | ✓ | ○ | Stomach, liver, or intestinal trouble | ○ | ✓ | ○ | Epilepsy or seizure | ○ | ✓ | ○ |
| Wear a hearing aid | ○ | ✓ | ○ | Gall bladder trouble or gallstones | ○ | ✓ | ○ | Car, train, sea, or air sickness | ○ | ✓ | ○ |
| Stutter or stammer | ○ | ✓ | ○ | Jaundice or hepatitis | ○ | ✓ | ○ | Frequent trouble sleeping | ○ | ✓ | ○ |
| Wear a brace or back support | ○ | ✓ | ○ | Broken bones | ○ | ✓ | ○ | Depression or excessive worry | ○ | ✓ | ○ |
| Scarlet fever | ○ | ✓ | ○ | Adverse reaction to medication | ○ | ✓ | ○ | Loss of memory or amnesia | ○ | ✓ | ○ |
| Rheumatic fever | ○ | ✓ | ○ | Skin diseases | ○ | ✓ | ○ | Nervous trouble of any sort | ○ | ✓ | ○ |
| Swollen or painful joints | ○ | ✓ | ○ | Tumor, growth, cyst, cancer | ○ | ✓ | ○ | Periods of unconsciousness | ○ | ✓ | ○ |
| Frequent or severe headaches | ○ | ✓ | ○ | Hernia | ○ | ✓ | ○ | Parent/sibling with diabetes, cancer, stroke, or heart disease | ○ | ✓ | ○ |
| Dizziness or fainting spells | ○ | ✓ | ○ | Hemorrhoids or rectal disease | ○ | ✓ | ○ | X-ray or other radiation therapy | ○ | ✓ | ○ |
| Eye trouble | ○ | ✓ | ○ | Frequent or painful urination | ○ | ✓ | ○ | Chemotherapy | ○ | ✓ | ○ |
| Hearing loss | ○ | ✓ | ○ | Bed wetting since age 12 | ○ | ✓ | ○ | Asbestos or toxic chemical exposure | ○ | ✓ | ○ |
| Recurrent ear infections | ○ | ✓ | ○ | Kidney stone or blood in urine | ○ | ✓ | ○ | Plate, pin or rod in any bone | ○ | ✓ | ○ |
| Chronic or frequent colds | ○ | ✓ | ○ | Sugar or albumin in urine | ○ | ✓ | ○ | Easy fatigability | ○ | ✓ | ○ |
| Severe tooth or gum trouble | ○ | ✓ | ○ | Sexually transmitted disease | ○ | ✓ | ○ | Been told to cut down on or criticized for alcohol abuse | ○ | ✓ | ○ |
| Sinusitis | ○ | ✓ | ○ | Recent gain or loss of weight | ○ | ✓ | ○ | Used illegal substances | ○ | ✓ | ○ |
| Hay Fever or allergic rhinitis | ○ | ✓ | ○ | Eating disorder (anorexia, bulimia, etc.) | ○ | ✓ | ○ | | | | |
| Head injury | ○ | ✓ | ○ | Arthritis, Rheumatism, or Bursitis | ○ | ✓ | ○ | | | | |
| Asthma | ○ | ✓ | ○ | Thyroid trouble or goiter | ○ | ✓ | ○ | | | | |

FIG. 5.

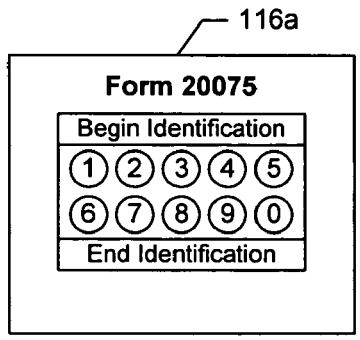
FIG. 6a.
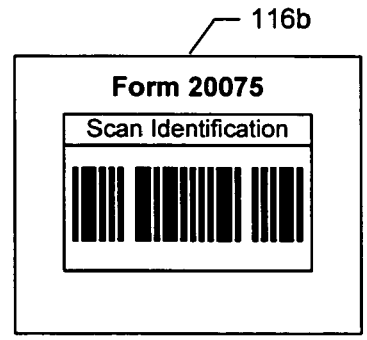
FIG. 6b.
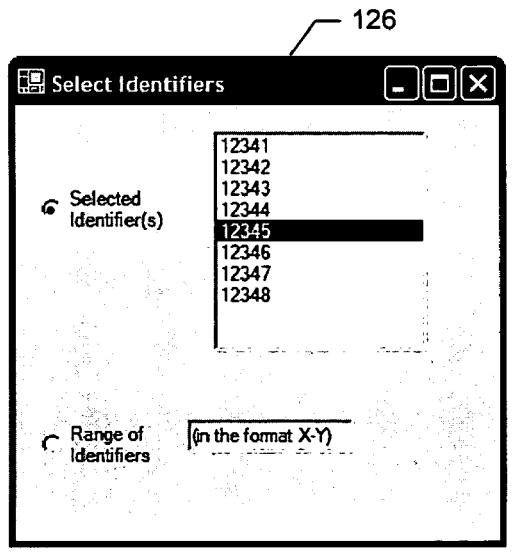
FIG. 6c.
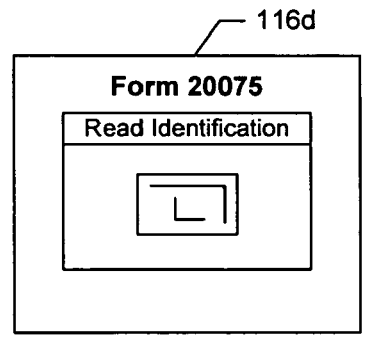
FIG. 6d.
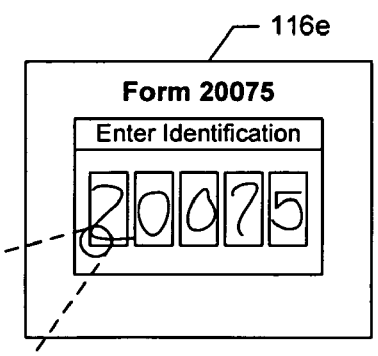
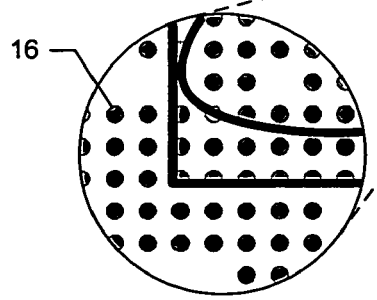
FIG. 6e.

SYSTEM AND METHOD FOR ASSOCIATING HANDWRITTEN INFORMATION WITH ONE OR MORE OBJECTS

FIELD OF THE INVENTION

The present invention relates generally to the processing of handwritten information and, more particularly, to systems and methods for associating handwritten information with one or more objects such as electronic forms, database records or the like.

BACKGROUND OF THE INVENTION

Pen-enabled computing is a relatively recent development wherein a user interfaces with a computing system by way of a writing stylus and writing surface instead of a mouse or a keyboard. The writing surface may comprise, for example, a blank sheet of paper or a preprinted form. The writing stylus, in turn, may comprise a device capable of inputting data (a "handwriting input") into the pen-enabled computing system while providing both a visible, or "written ink," copy of the data on the writing surface and an "electronic" copy of the data within the pen-enabled computing system. Such a writing stylus may comprise, for example, a conventional pen, a conventional pencil, a radio transmitter, a magnetic or electric field device, an optical device, an ultrasound transceiver, or combinations thereof.

Once the electronic copy of the data is entered into the pen-enabled computing system, the data may be stored as an "electronic ink" copy, wherein the handwriting input is captured as written, or as a "text" copy, wherein the handwriting input is captured, recognized, and translated into the corresponding text. In some instances, the pen-enabled computing system may be capable of producing both an electronic ink and a text copy of the handwriting input. Since the writing stylus is generally capable of providing a written ink copy of the handwriting input on the writing surface, the user is automatically provided with a hard copy, or visual feedback, of the entered data. It is understood, however, that a written ink copy of the handwriting input may not be provided in some instances, wherein the handwriting input is only captured and stored in the pen-enabled computing system as an electronic copy. Examples of pen-enabled computing devices include the Tablet PC offered by Microsoft Corporation, as well as any of a number of digital pens enabling Anoto functionality developed by Anoto AB of Lund, Sweden. In this regard, digital pens enabling Anoto functionality include, for example, digital pens offered by Logitech Inc., Nokia Corporation, Hitachi Maxell Ltd. and Sony Ericsson Mobile Communications AB.

Typically, the pen-enabled computing system senses the position and/or movement of the writing stylus with respect to the writing surface, which is stored in the pen-enabled computing system as a series of electronic ink data points constituting the handwriting input. In these systems, the electronic ink data points consist of, or are converted to, sets of Cartesian coordinates representing points along the path of the writing stylus as it moves with respect to the writing surface. The handwriting input is often then desirably used for other purposes. However, for the handwriting input to be subsequently utilized, it is often translated from the user's handwriting to text form. While text translation schemes may facilitate practical uses for the handwritten data, they are often not able to accurately translate the user's handwriting. In addition, translation routines may require additional processing and storage capacity which could be used for other purposes and may add size and cost to the pen-enabled computing system.

Some conventional pen-enabled computing systems have been developed that interact with preprinted forms or other objects to which handwriting input may be associated. These systems typically include a pen-enabled computing device including a writing stylus and a handwriting capture interface, as such may be embodied in a digital pen. The digital pen is capable of cooperating with the preprinted form to permit data input into the various fields of the form to be captured and processed. In addition to one or more pieces of information (e.g., fields of a form), the writing surface of the preprinted form of one typical arrangement includes a preprinted pattern of machine-readable dots or other markings. The writing stylus and handwriting capture interface can then cooperate with one another, and the preprinted pattern, to determine the position of the writing stylus with respect to the writing surface of the preprinted form to thereby detect and capture handwriting input to associate with the preprinted form, and if so desired, further based upon portion(s) of the writing surface receiving handwriting input. Further, in addition to facilitating determination of the position of the writing stylus, the preprinted pattern of one conventional arrangement also permits identification of the nature or identity of the preprinted form, page of a multi-page preprinted form or the like. In this regard, each different preprinted form and/or page of a preprinted form can include a different pattern printed thereon, where the pattern is associated with the form and/or page. Thus, in addition to determining the position of the writing stylus with respect to the writing surface of a preprinted form, the pen-enabled computing system may also identify the form and/or page of the form based upon the preprinted pattern.

Whereas conventional pen-enabled computing systems are adequate in performing a number of different functions with respect to handwriting input, such systems may also have drawbacks. For example, a number of conventional pen-enabled computing systems do not provide adequate user interaction to guide a user through use of the respective systems. More particularly, for systems that require the user to perform one or more steps in a specific, predetermined order to properly effectuate use of the pen-enabled computing systems, conventional systems often require the user to know the sequence and do not adequately inform the user when the user performs one or more steps out of sequence. Further, although a preprinted pattern of dots or other markings may adequately enable identification of a particular preprinted form and/or page of a form, in various instances it may be undesirable to provide unique preprinted patterns for each different form and/or page. For example, a printer or other facility for printing such preprinted forms may only be capable of printing a limited number of different patterns, thus restricting the number of different forms and/or pages that may be associated therewith. Also, for example, it may be more costly for a printer or other facility to print preprinted forms with an increasing number of different patterns, and correspondingly, for an end user to acquire such preprinted forms.

SUMMARY OF THE INVENTION

In light of the foregoing background, the present invention provides a system and method for capturing and processing form data utilizing a handwriting capture arrangement. The system and method of embodiments of the present invention prompt operation of the arrangement to sense an identifier (e.g., form identifier) associated with an object (e.g., form), such as by controlling vibration of a writing stylus to thereby prompt a user to operate the arrangement to sense the identifier. In contrast, conventional pen-enabled computing systems that do not similarly prompt operation of the arrangement undesirably allow the pen-enabled computing system to suffer from inefficient use by a user attempting to operate the arrangement to associate electronic handwriting input with an identifier, and thus an object, without first identifying the object. By providing such a prompt, embodiments of the present invention facilitate the user's awareness of proper operation of the pen-enabled computing arrangement such that the user can operate the arrangement to sense or otherwise identify an object, such as by means of an associated identifier, before capturing handwriting input to associate with the object.

As explained below, the identifier can be sensed in a number of different manners including, for example, by means of capturing initial electronic handwriting input and converting the initial electronic handwriting input into a text representation of the identifier such that the arrangement can sense the identifier based upon the text representation. However, as the arrangement may incompletely or inaccurately convert the initial electronic handwriting input thereby resulting in the arrangement sensing an unknown and/or improper identifier, embodiments of the present invention also provide for triggered verification of the identifier in such instances. In this regard, triggering verification of an unknown and/or improper identifier can include presenting at least a portion of the sensed identifier, such as that portion successfully converted into a text representation. A user can then verify the converted portion, and can additionally provide the remaining portion of the identifier such that the sensed identifier, including the additionally-provided portion, is known and/or proper.

To effectuate capturing and processing data in various instances, the arrangement can interact with printed paper that includes the identifier. In such instances, a first computing arrangement, such as the handwriting capture arrangement or another computing arrangement, can provide the printed paper. To facilitate providing such printed paper, embodiments of the present invention further include providing such printed paper by associating a number of object elements (e.g., form elements) with one another, including associating the identifier with the object and, if so desired, associating the identifier with a pattern from which a position of a writing stylus can be determined. The associated object elements, representations of the associated object elements and/or information related to the associated object elements can then be printed on a piece of paper, the resulting printed paper including the identifier. In this regard, in contrast to conventional computing systems that couple the pattern to the identifier, embodiments of the present invention therefore provide an identifier associated with, but decoupled from, the pattern. The same pattern can therefore be associated with more than one identifier, and thus more than one object. In addition to decoupling the identifier from the pattern, inspection of the printed paper can be facilitated by printing a reprint of the identifier associated with the object on printed paper including the identifier printed thereon. The resulting printed paper can then be inspected by identifying a match or mismatch between the reprint and the identifier printed on the paper.

More particularly, according to one aspect of the present invention, a system is provided that includes a pen-enabled computing arrangement that, in turn, includes a handwriting capture interface and at least one processing element in communication with the handwriting capture interface. The handwriting capture interface is capable of capturing an electronic handwriting input based upon a position of a writing stylus. The processing element is capable of sensing an identifier associated with an object. In this regard, the processing element is adapted to control vibration of a writing stylus to prompt a user to operate the arrangement to sense the identifier, or alternatively, adapted to automatically sense the identifier without user operation of the arrangement to sense the identifier. After sensing the identifier, the processing element can associate electronic handwriting input with the sensed identifier to thereby associate the electronic handwriting input with the object associated with the identifier. In this regard, the processing element can control the vibration such that the user is prompted if a predetermined amount of time passes before sensing the identifier.

After associating the electronic handwriting input with an object, the processing element can process the electronic handwriting input based upon the associated object. For example, the object may comprise a data base record. The processing element can, in such instances, process the electronic handwriting input by facilitating storage of the electronic handwriting input and/or a representation of the electronic handwriting input in the associated database record. For example, the processing element can package the electronic handwriting input along with the identifier, and transfer the packaged data to a computing arrangement for storage in the database record.

In various instances the identifier is encoded within a barcode. In such instances, the processing element can control vibration of the stylus to prompt the user after receiving user input other than a scanned barcode, and before sensing the identifier. Thus, the processing element can save the user from unnecessary prompting until the user attempts to provide input to be associated with an as yet not sensed identifier.

In other instances, the identifier is sensed from initial electronic handwriting input corresponding to the identifier. In these instances, handwriting capture interface can be capable of capturing initial electronic handwriting input corresponding to the identifier, with the processing element thereafter being capable of converting the initial electronic handwriting input into a text representation of the initial electronic handwriting input. The processing element can then sense the identifier based upon the text representation of the initial electronic handwriting input. It may be the case, however, that the sensed identifier is unknown and/or improper. Consider for example that the identifier may comprise a modulus number including a check digit, where the check digit is also encoded within a pattern. In such instances, the processing element can be further capable of sensing the check digit of the identifier based upon the pattern encoding the check digit, and thereafter determining if the sensed identifier is known and proper based upon the sensed check digit.

If the sensed identifier is unknown and/or improper, the processing element can be further capable of triggering verification of the identifier when the sensed identifier is not known and proper. More particularly, for example, the processing element can direct a display to present at least a portion of the sensed identifier, such as the text representation of a properly converted portion of the initial electronic handwriting input. Then, the processing element can receive at least a portion of the identifier, such as the remaining unconverted or improperly converted portion of the initial electronic handwriting input, based upon the presented portion of the sensed identifier. As such, the processing element can be capable of sensing a known and/or proper identifier, the identifier including the received portion.

In other instances, the identifier is encoded within a radio frequency (RF) identification (RFID) tag. In such instances, the pen-enabled computing arrangement further comprises an RF interrogator in communication with the processing element. The processing element can therefore sense the identifier by reading the identifier from the RFID tag by means of the RF interrogator.

In yet other instances, the identifier is included on the object in a human-readable form, such as relative to an identifiable portion (e.g., edge) of the object. The pen-enabled computing arrangement in such instances can further include a camera capable of imaging at least a portion of the object including the identifier such that the image of the respective portion of the object includes the identifier and, if so desired, the identifiable portion of the object. The camera can be triggered to image the identifier in a number of different manners including, for example, upon the writing stylus being brought into proximate contact with the object. After imaging the portion of the object including the identifier, the processing element can automatically sense the identifier by receiving the image including the identifier, converting the image of the identifier into a machine-readable form, and thereafter sensing the identifier based upon the machine-readable form of the form identifier. More particularly, the processing element can sense the identifier by segmenting the identifier within the image based upon the identifiable portion of the object and a location of the identifier relative to the identifiable portion, and converting the image based upon the segmented identifier.

The pen-enabled computing arrangement can effectuate capturing and processing data by interacting with printed paper. The system can therefore further include a first computing arrangement capable of providing such printed paper, where the printed paper includes the identifier. The handwriting capture interface can thereafter capture the electronic handwriting input based upon a position of the writing stylus with respect to the printed paper, with the processing element being capable of sensing the identifier from the printed paper.

To provide the printed paper, the first computing arrangement can be capable of selecting a plurality of object elements (e.g., form elements), the selected object elements including an identifier independent of an object. The first computing arrangement can associate the selected object elements with one another, including associating the identifier with the object. Then, the first computing arrangement can direct a printer to print, on a piece of paper, the associated object elements, representations of the associated elements and/or information related to the associated elements. The resulting printed paper, including the identifier, can thereafter be provided by the first computing arrangement to the pen-enabled computing arrangement. In various instances, the selected elements can further include a pattern from which a position of the writing stylus is capable of being determined. In such instances, the first computing arrangement can further associate the pattern with the identifier. In addition, the first computing arrangement can be capable of directing the printer to further print a reprint of the printed identifier associated with the object on printed paper including the identifier. By printing such a reprint of the associated identifier, the first computing arrangement is capable of facilitating inspection of the resulting printed paper by identifying a match or mismatch between the reprint and the printed identifier.

BRIEF DESCRIPTION OF THE DRAWINGS

Figure 1:
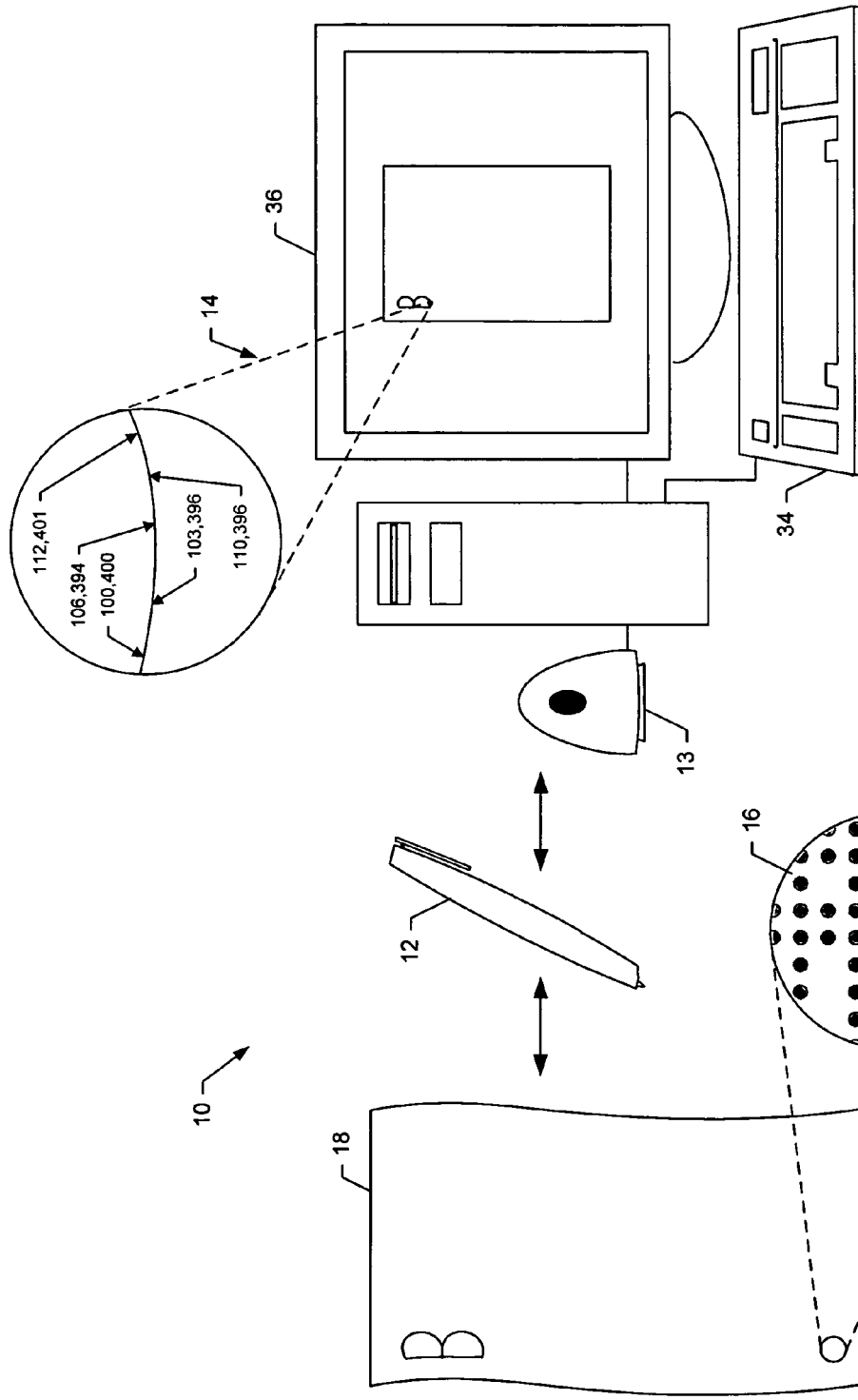
Figure 2:
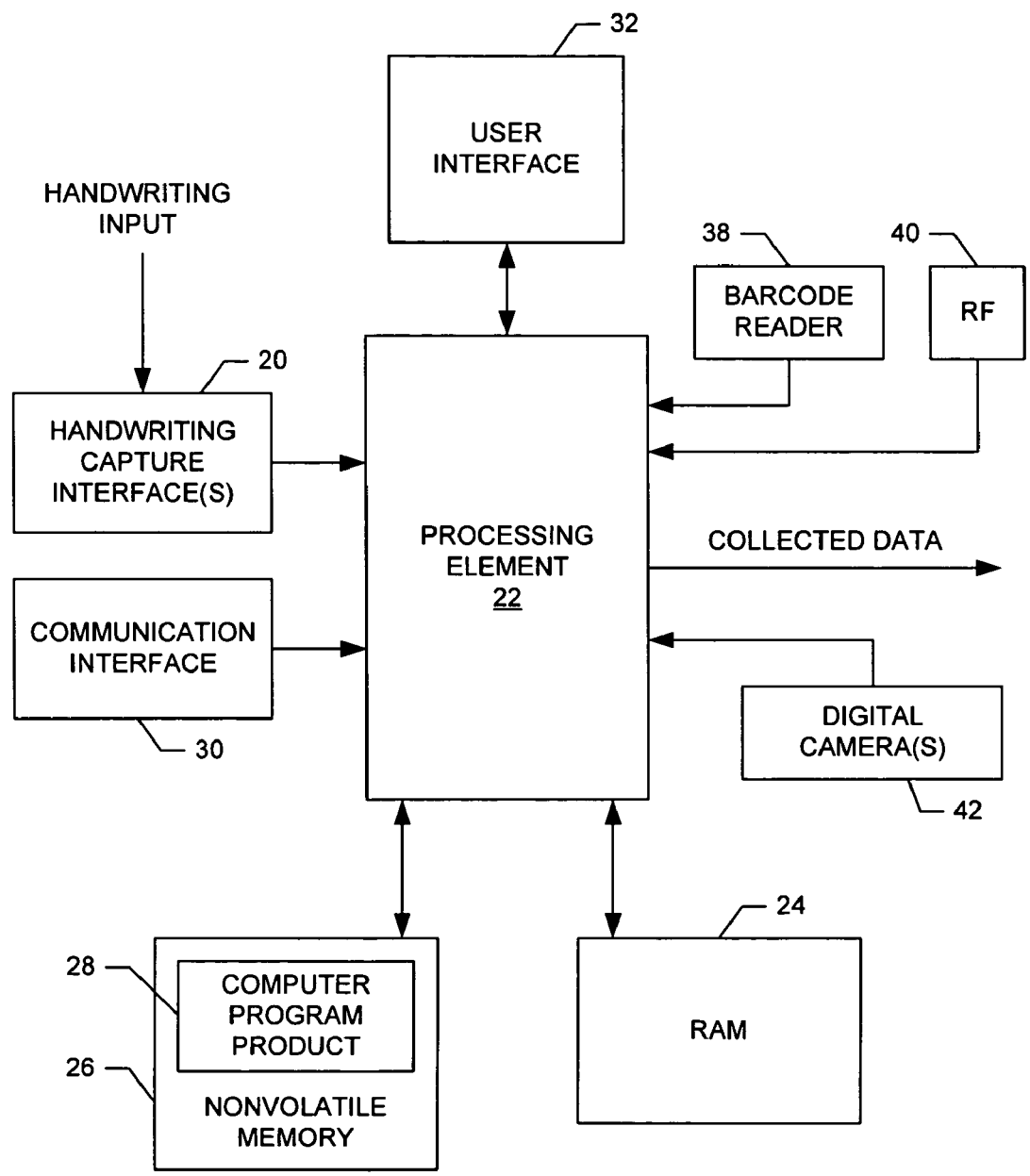
Figure 3:
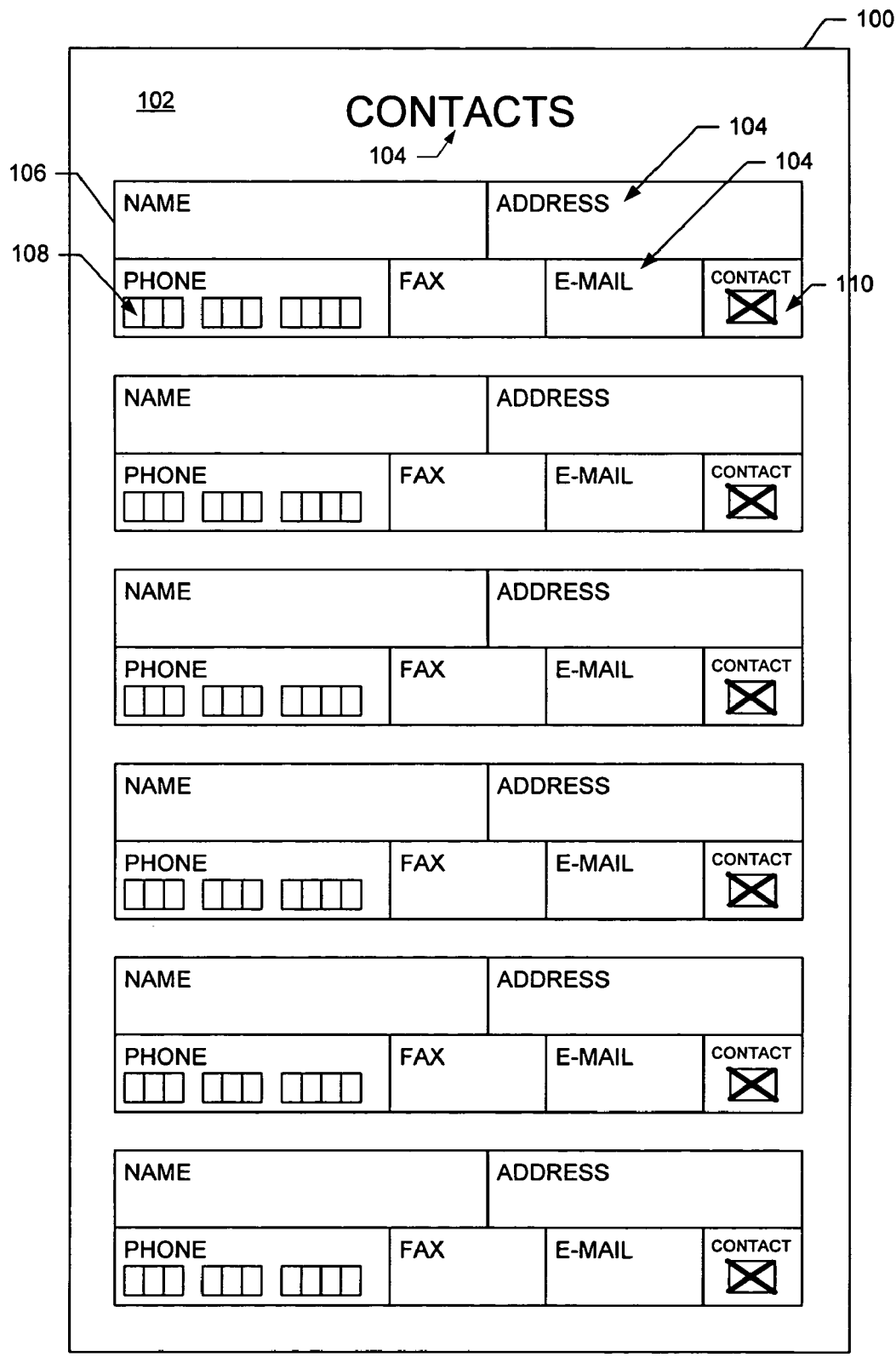
Figures 6F, 9, 10:
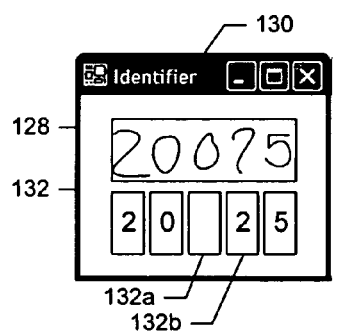
Figure 7:
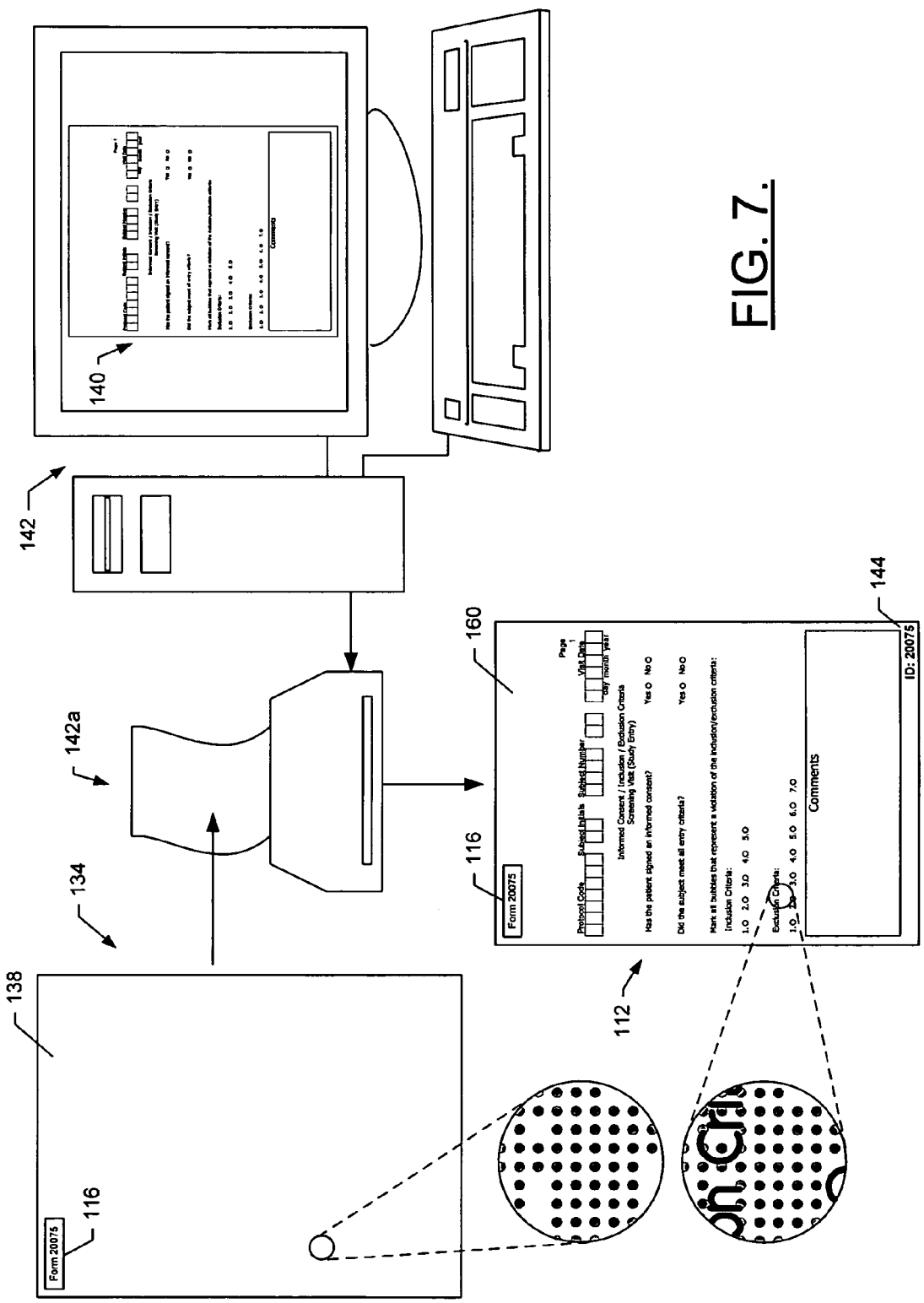
Figure 8:
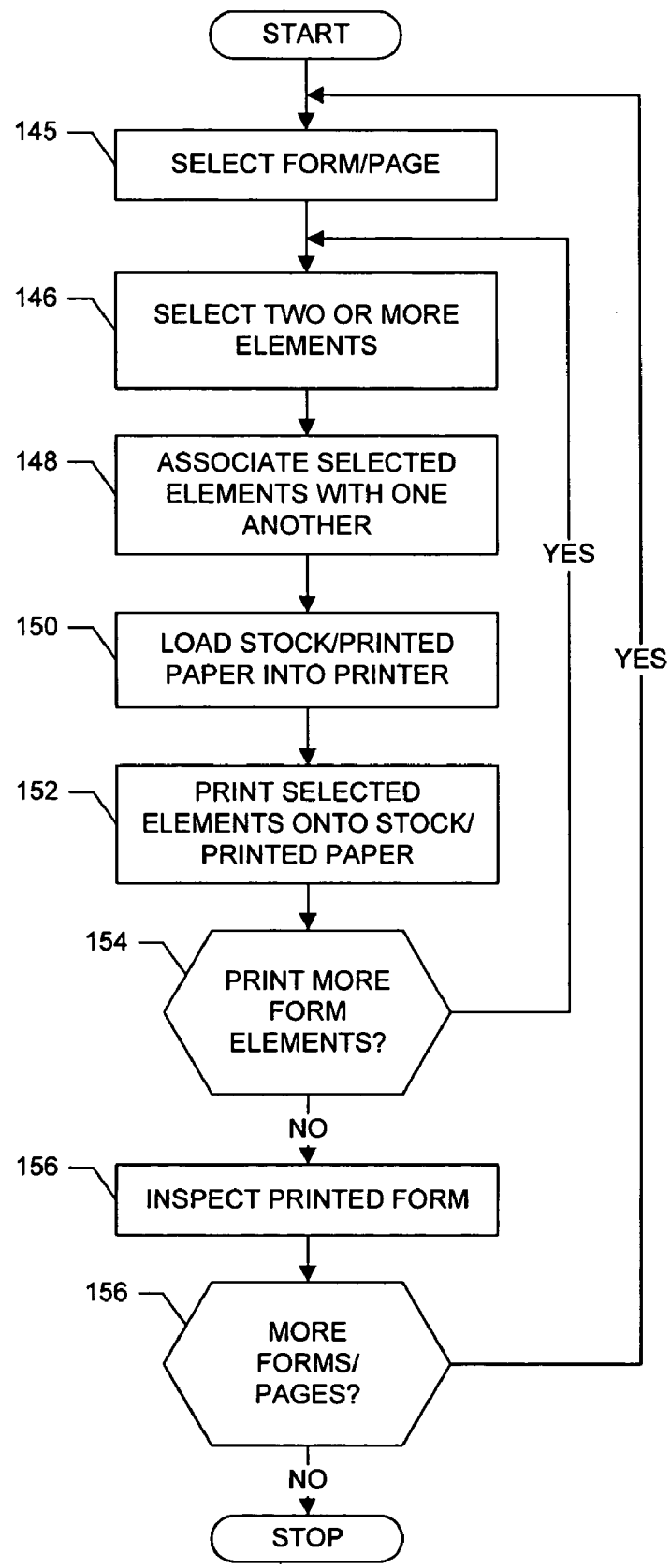
Figure 11A:
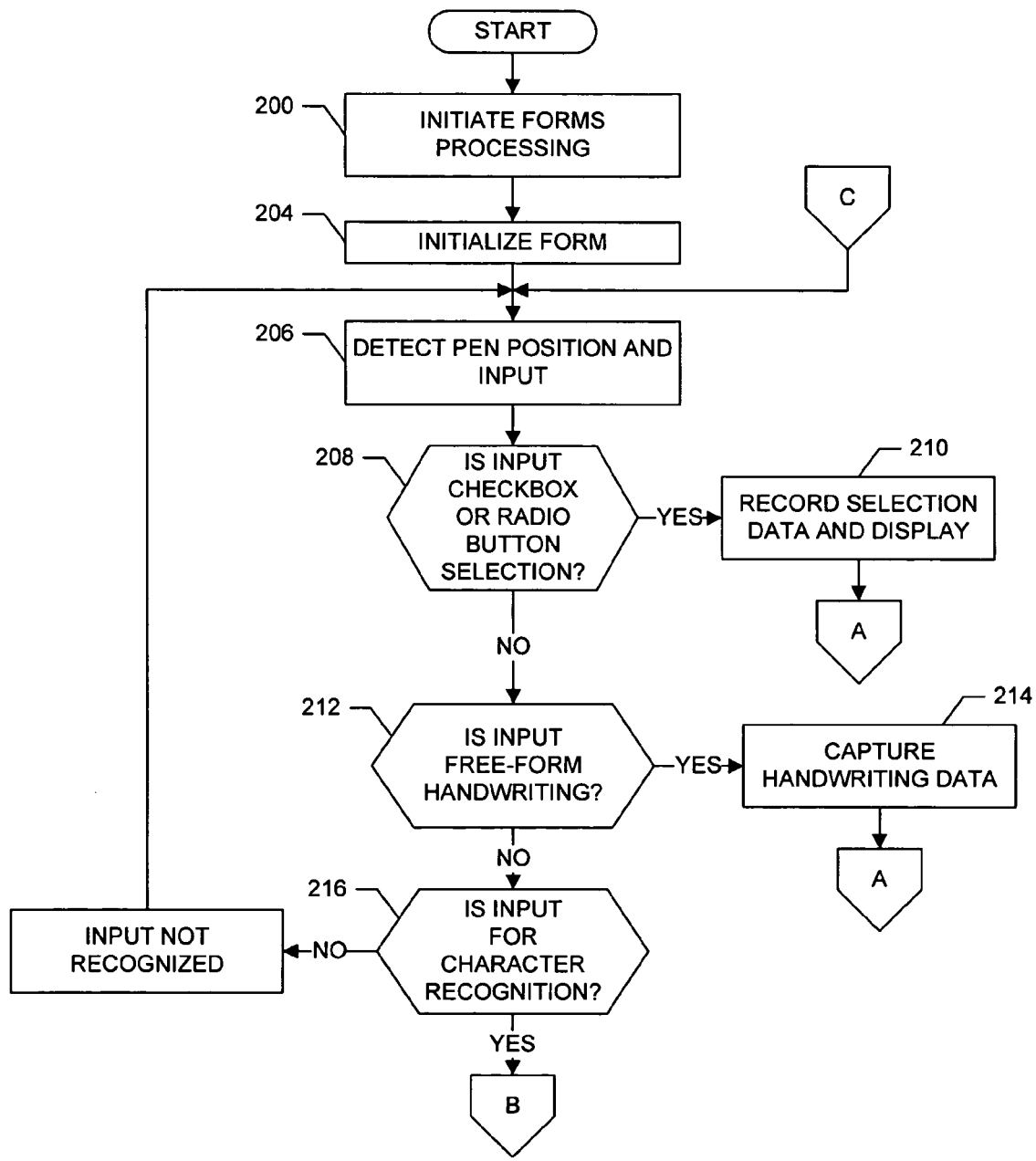
Figure 11B:
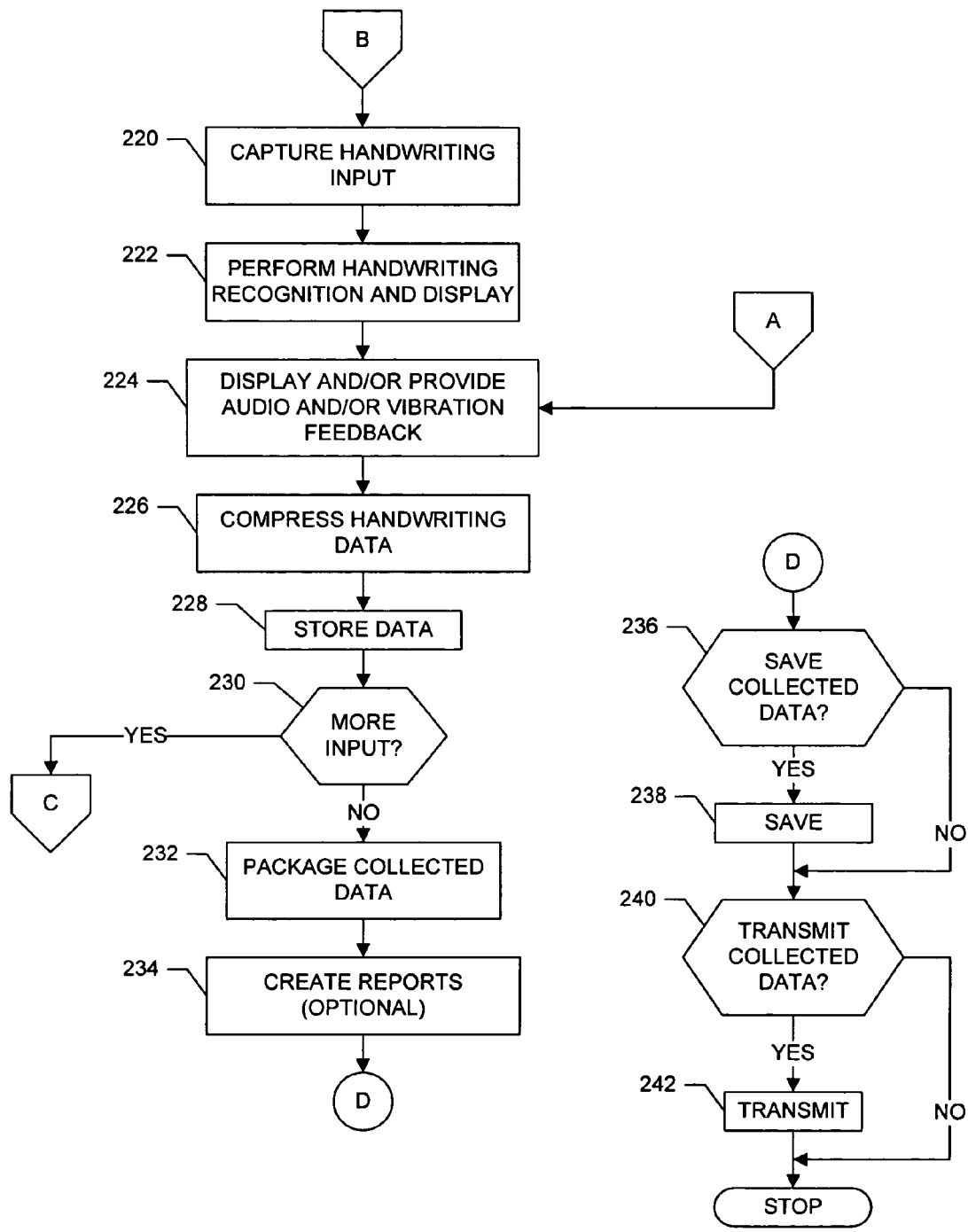
Figure 12:
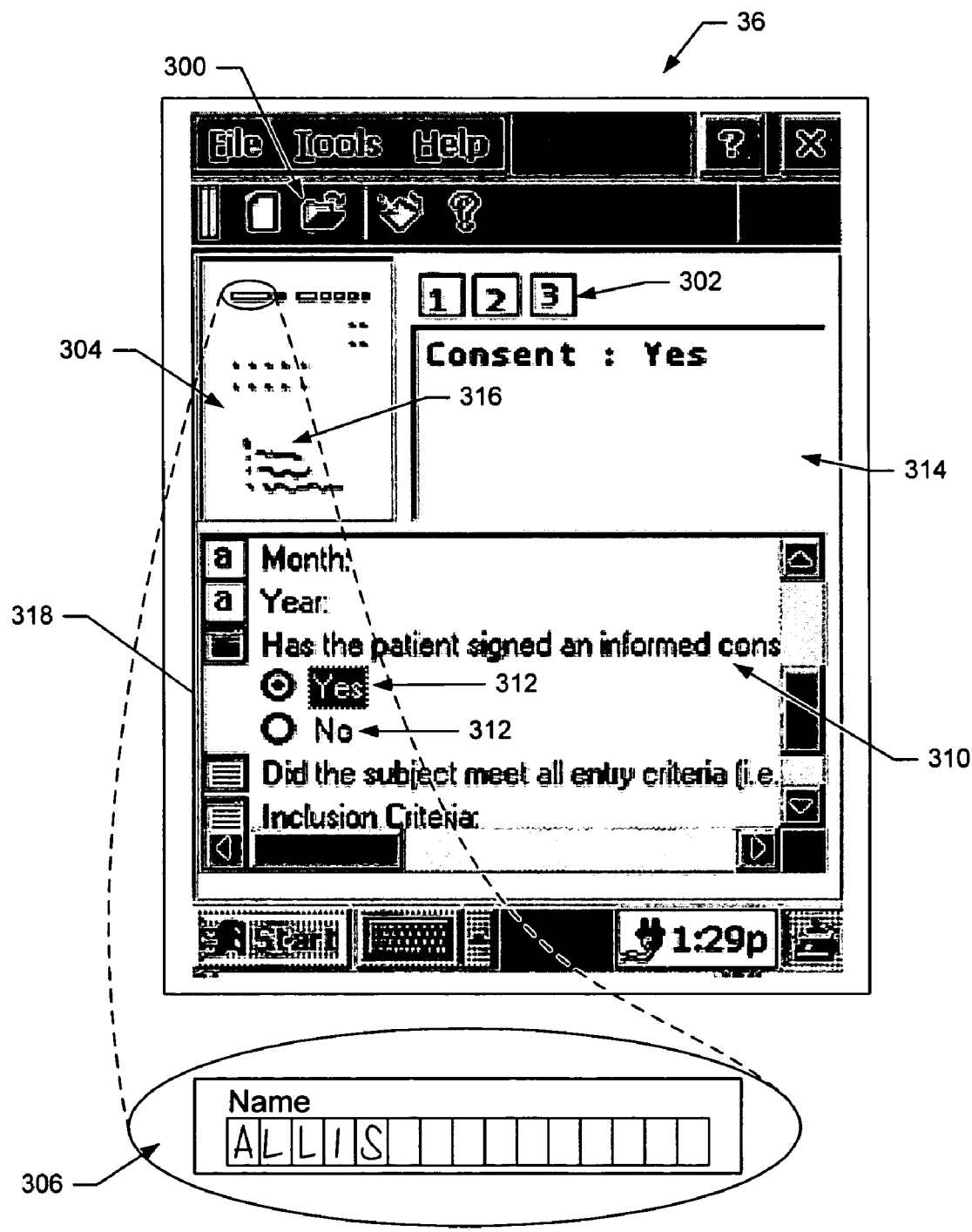
Figure 13:
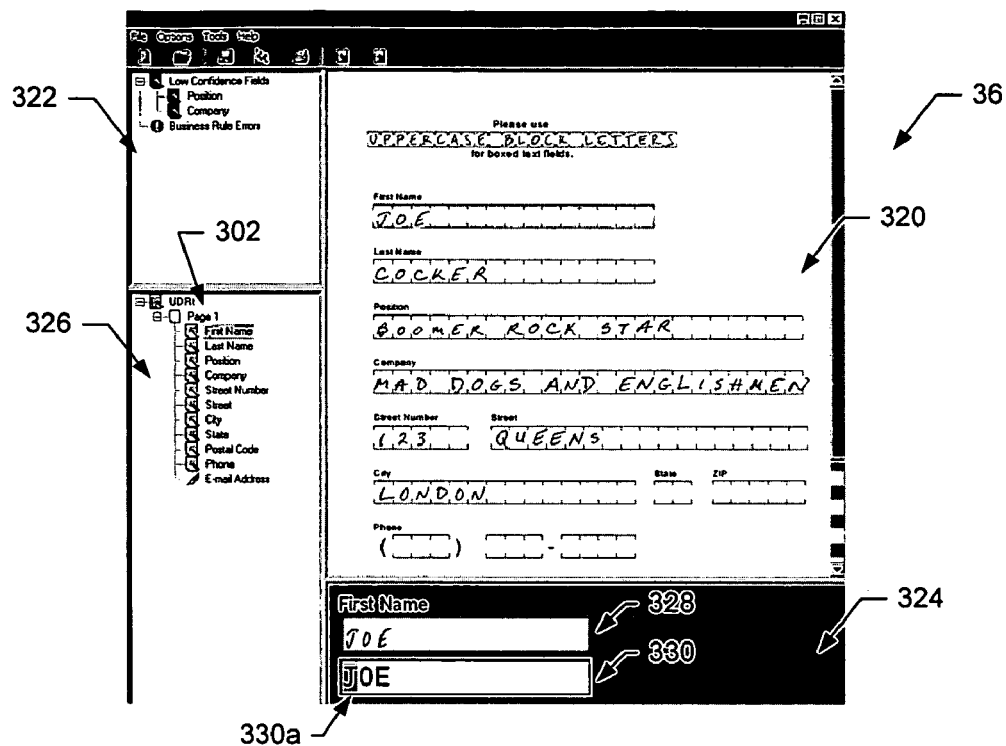
Figure 14:
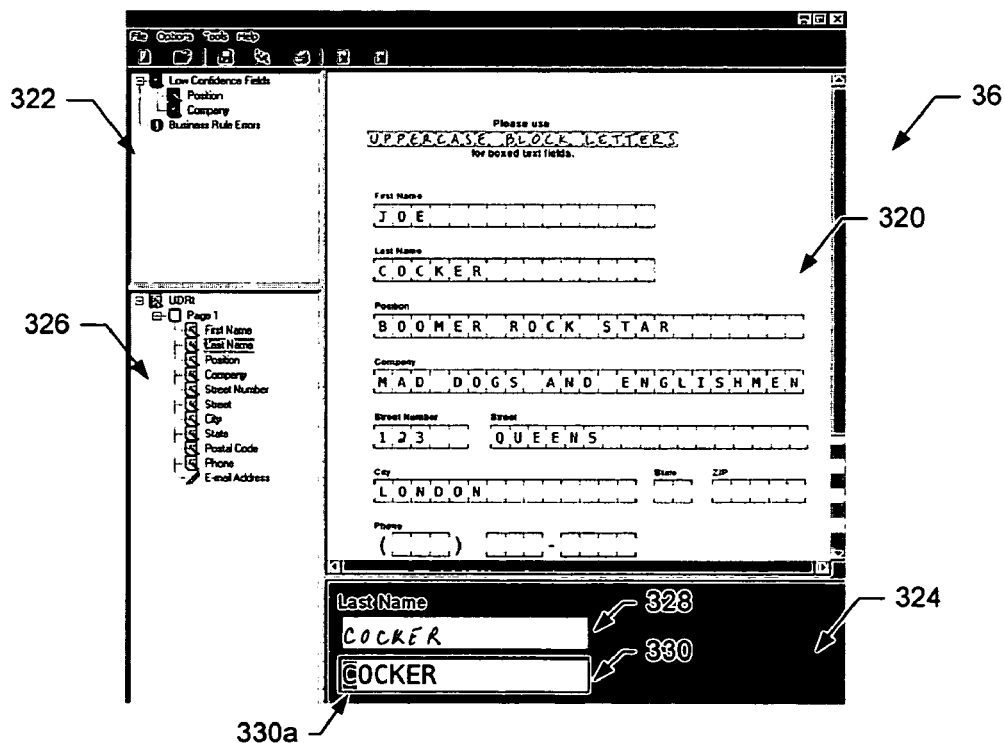
Figure 15:
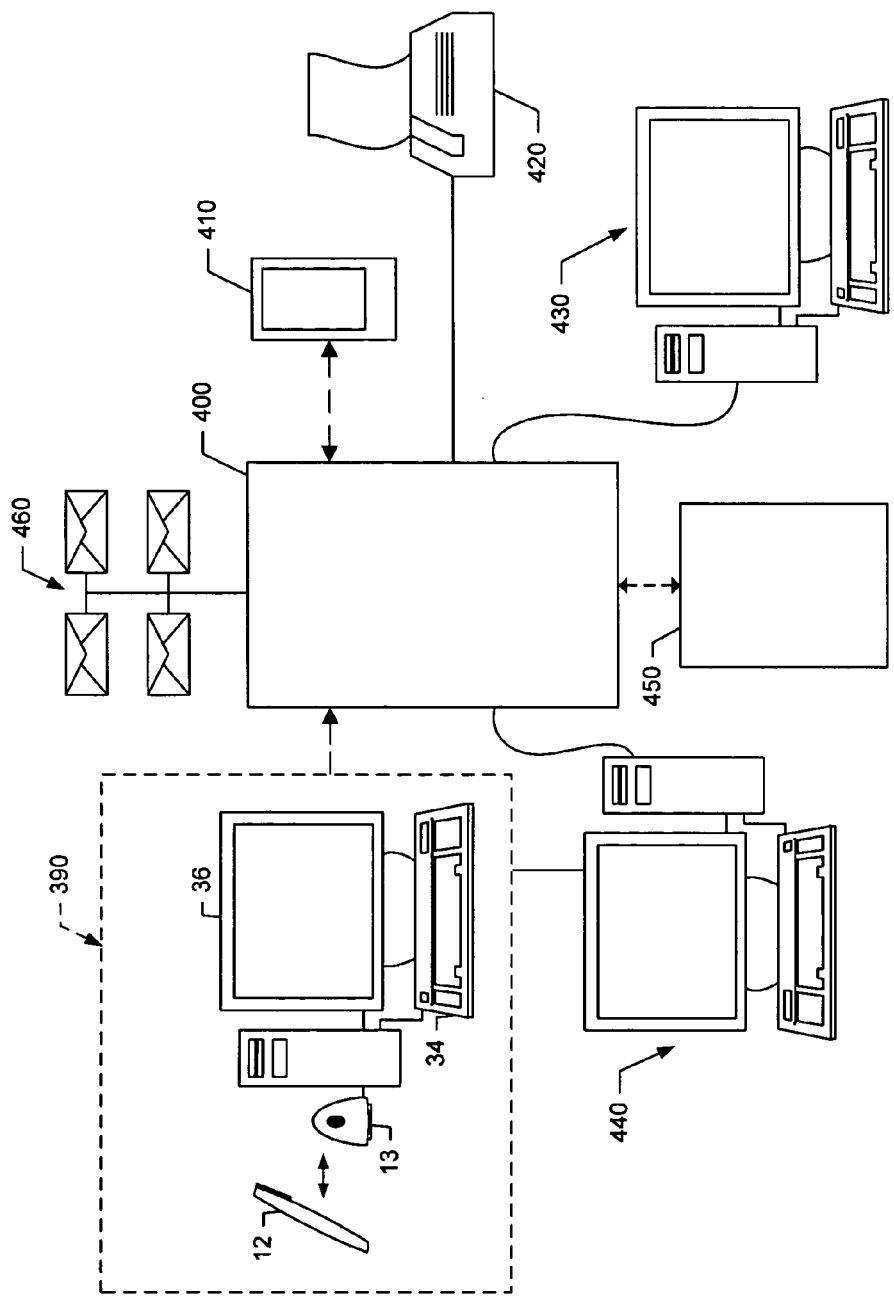

Having thus described the invention in general terms, reference will now be made to the accompanying drawings, which are not necessarily drawn to scale, and wherein:

FIG. 1 is a schematic diagram illustrating the pen-enabled computing device according to one embodiment of the present invention with exploded views illustrating a series of electronic ink data points and a position-encoding dot pattern;

FIG. 2 is a block diagram illustrating some of the components of the pen-enabled computing device according to one advantageous embodiment of the present invention;

FIG. 3 is an example of a contacts form in accordance with one embodiment of the present invention;

FIG. 4 is an example of a medical form in accordance with one embodiment of the present invention;

FIG. 5 is another example of a medical form in accordance with one embodiment of the present invention;

FIGS. 6a-6f are functional block diagrams of a number of different means for sensing an identifier associated with a form that may also include a corresponding human-readable version of the identifier, the illustrated means including depressing regions corresponding to characters of the identifier (FIG. 6a), scanning a bar code having the identifier encoded therein (FIG. 6b), selecting the identifier from a menu or a range of identifiers (FIG. 6c), reading a radio frequency identification (RFID) tag having the identifier encoded therein (FIG. 6d), receiving electronic handwriting input corresponding to the identifier (FIG. 6e), and receiving an image of a portion of the form including the identifier (FIG. 6f);

FIGS. 7 and 8 illustrate a functional block diagram and flowchart, respectively, of a method of associating a form (i.e., object) with an identifier and providing the form to a user, in accordance with one embodiment of the present invention;

FIG. 9 illustrates a functional block diagram of imaging a portion of the form including an identifier in accordance with the means for sensing an identifier shown in FIG. 6f;

FIG. 10 is an example user interface element presenting at least a portion of a sensed identifier for verification;

FIGS. 11a and 11b are flow diagrams illustrating a method of capturing and processing form data by a pen-enabled computing device according to one embodiment of the present invention;

FIGS. 12, 13 and 14 are schematic diagrams illustrating example displays of a pen-enabled computing arrangement according to one embodiment of the present invention;

FIG. 15 depicts a system for transmitting and/or processing form data according to one embodiment of the present invention; and FIGS. 16a-16f are flow diagrams illustrating the further processing of form data according to one embodiment of the present invention.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

The pen-enabled computing arrangement 10 of embodiments of the present invention can be embodied in a number of different manners. In one embodiment depicted in FIG. 1, however, the pen-enabled computing arrangement includes a writing stylus capable of interfacing with one or more computing systems, devices or the like, to capture handwritten information and thereafter processing the handwritten information as described hereinbelow. More particularly, in the illustrated embodiment, the writing stylus is embodied by a digital pen 12 which, in turn, is capable of interfacing and communicating with one or more computing systems 14. Examples of such a digital pen include any of a number of digital pens enabling Anoto functionality such as, for example, digital pens offered by Logitech Inc., Nokia Corporation, Hitachi Maxell Ltd. and Sony Ericsson Mobile Communications AB. Examples of such computing systems included stationary computing systems such as personal computers (PC's), server computers or the like, and/or portable or handheld computing systems such as personal digital assistants (PDA's), personal communication systems (PCS's), smart phones, portable (e.g., laptop) computers or the like. As shown and described herein, the digital pen can interface, and thus communicate, with the computing system in any of a number of different wireline and/or wireless manners. For example, the digital pen can be adapted to interface with a cradle 13 which, in turn, is coupled to the computing system by means of a Universal Serial Bus (USB) or RS232 connection. Additionally or alternatively, for example, the digital pen can be adapted to operate in accordance with Bluetooth brand wireless technology developed by the Bluetooth Special Interest Group to thereby interface, and thus communicate, with the computing system.

As explained herein, reference will be made to several "arrangements," including the pen-enabled computing arrangement 10. The term "arrangement" is most commonly used herein to describe an assembly or system including a plurality of components, elements, devices, assemblies, systems or the like, including for example, the digital pen 12 and the computing system 14. It should be understood, however, that the term "arrangement" may more generally refer to a component, element, device, assembly, system or the like, separate from, or included within, an arrangement of a plurality of such components, elements, devices, assemblies, systems or the like. Thus, as used herein, the terms "arrangement," "component," "element," "device," "assembly," "system," and like terms may be used interchangeably without departing from the spirit and scope of the present invention.

Referring now to FIG. 2, a block diagram of an entity capable of operating as a digital pen 12 and/or a computing system 14 is shown in accordance with one embodiment of the present invention. Although shown as separate entities, in some embodiments, one or more entities may support one or more of a digital pen and a computing system, logically separated but co-located within the entit(ies). It should be understood, however, that although the writing stylus is described as being embodied in a digital pen, the pen-enabled computing arrangement 10 need not include a digital pen. In such instances, the pen-enabled computing arrangement can include a writing stylus embodied in any of a number of other manners such that the arrangement is capable of operating in accordance with embodiments of the present invention, as described herein.

As shown, the entity capable of operating as a digital pen 12 and/or a computing system 14 includes one or more handwriting capture interfaces 20 that are responsive to the writing stylus for capturing handwritten information. When the entity comprises a digital pen 12, for example, the handwriting capture interface can be adapted to identify the position of the digital pen by optical, electric or magnetic means or by any other means known to those skilled in the art. More particularly, for example, the digital pen can include a first digital camera adapted to sense a preprinted pattern 16 of machine-readable dots or other markings (a portion being shown in an exploded inset of FIG. 1) on a writing surface 18 to determine the position of the digital pen, and thus the writing stylus. The first digital camera, in turn, can include one or more infrared light-emitting diodes (LED's) capable of illuminating the writing surface, and a light-sensitive (e.g., CCD, CMOS, etc.) sensor capable of recording a two-dimensional image. In operation, the preprinted pattern absorbs the infrared light emitted by the infrared LED's in a manner that illuminates the pattern to the light-sensitive sensor, which can thereafter record an image based upon the illuminated pattern. For examples of techniques providing such preprinted patterns, see U.S. Pat. No. 6,548,768, entitled: Determination of a Position Code, issued Apr. 15, 2003; and U.S. Pat. No. 6,592,039, entitled: Digital Pen using Interferometry for Relative and Absolute Pen Position, issued Jul. 15, 2003.

Alternatively, for example, when the entity comprises a computing system 14, the handwriting capture interface 20 can include a touch sensitive screen capable of identifying those points on the screen with which one or more objects, such as the writing stylus, a user's appendage (e.g., finger) or the like, comes into contact therewith, and capable of providing signals representative of the coordinates of the respective points on the screen. Additionally or alternatively, when the entity comprises a computing system the handwriting capture interface can include a screen with an electromagnetic digitizer that cooperates with the writing stylus to determine the position of the writing stylus relative to the screen at a plurality of successive instances in time. In another alternative, the handwriting capture interface of a computing system can include an electronic handwriting tablet that cooperates with the writing stylus to determine the position of the writing stylus relative to the electronic handwriting tablet at a plurality of successive instances in time. In such instances, the writing stylus may include a radio transmitter, an ultrasound transceiver or the like for communicating with the electronic handwriting tablet. As such, the electronic handwriting tablet of these embodiments would include a corresponding receiver for detecting the signals indicative of the position of the writing stylus.

In addition to capturing a plurality of "electronic ink" data points defining the position of the writing stylus over time, a written record of the handwritten information may also be created. For example, the digital pen 12 embodying the writing stylus can also include an ink pen, while the writing surface comprises printed paper. In such instances, the ink pen of the digital pen can be adapted to concurrently mark upon the paper while the digital pen creates the plurality of "electronic ink" data points.

Regardless of the manner in which the handwriting capture interface 20 is embodied, the handwriting capture interface captures and provides a series of data points, typically represented by X,Y coordinate points, representative of the position of the digital pen 12, or more particularly the writing stylus embodied by the digital pen, at a plurality of successive instances in time. The set of coordinate points from the time at which the writing stylus initiates contact with the touch sensitive screen, electronic handwriting tablet or paper to the time at which the writing stylus is lifted from the touch sensitive screen, electronic handwriting tablet or paper defines a writing stroke, a plurality of which typically define the handwritten information that has been entered by the user.

As also shown in FIG. 2, in addition to the handwriting capture interface 20, the entity capable of operating as a digital pen 12 and/or a computing system 14 also includes a processing element 22, such as a central processing unit, and associated memory, such as random access memory (RAM)

24 and a non-volatile storage device 26. The non-volatile storage device, such as, for example, flash memory, an EEPROM or a disk, is typically used for storing and/or executing a computer program product 28 as well as storing useful data such as, for example, electronic ink data, compressed representations of the electronic ink data and/or text representations of handwritten data, as described below. Further, the RAM is generally used for loading and executing the computer program product and for storing various pieces of data during execution of the computer program product. As described below, the computer program product generally cooperates with the processing element to control the operation of the respective entity, as described below in accordance with embodiments of the present invention. It should be understood, however, that even though the computer program product can control the operation of the entity, this control can, instead, be accomplished through various hardware or firmware configurations without departing from the spirit and scope of the present invention. Generally, the computer program product can drive the handwriting capture interface to interface and cooperate with a writing stylus and can subsequently control the processing of the electronic ink data points that have been captured.

In the illustrated embodiment, the handwriting capture interface 20 is a discrete component from the remainder of the entity capable of operating as a digital pen 12 and/or a computing system 14, and is adapted to communicate with the remainder of the respective entity, including the processing element 22, via any conventional communications technique, including a wired connection such as a USB or RS232-connection, and/or a wireless connection such as by means of a Bluetooth interface. In this regard, the entity can include a communication interface 30 for facilitating wireline and/or wireless communication. For example, the entity can include an antenna for facilitating wireless communication, and/or an external device interface for facilitating wired connections. Additionally, although not illustrated, the entity may include a removable storage medium for uploading data to be downloaded by other components. However, the entity can be formed as a single component with the handwriting capture interface, the processing element, the associated memory and any other elements assembled in a single package.

The entity capable of operating as a digital pen 12 and/or a computing system 14 can also include a user interface 32. The user interface includes provisions for facilitating interaction between the respective entity and a user. When the entity comprises a digital pen, for example, the user interface can include a user input interface comprising one or more control buttons, such as for initiating functions within the entity or for providing other types of input. Similarly, when the entity comprises a computing system, the user interface can include a user input interface comprising, for example, a keyboard 34, keypad or the like. In addition, the computing system can include a display 36 such as, for example, a viewing screen or monitor for allowing the user to view displayed data or status information. Also, the user interface of the computing system may comprise a touch screen or other digitizer that allows the user to input handwriting data directly into the computing system as part of the handwriting capture interface.

In addition to the user input interface, the user interface 32 of the entity capable of operating as a digital pen 12 and/or computing system 14 can include an audio mechanism such as, for example, a buzzer, bell, or other indicator or other devices capable of supporting voice interaction between the entity and the user. Also, for example, a vibration mechanism may also be used as an alert or acknowledge indicator, particularly when the entity comprises a digital pen. In such instances, the entity is capable of providing aural, vibration and/or visual feedback to the user as the user interacts with the respective entity. Accordingly, the user interface may be implemented in many different manners, combinations thereof, and/or in conjunction with different components of the entity.

The entity capable of operating as a digital pen 12 and/or computing system 14 can also include one or more additional means for sharing and/or obtaining data over a short-range communication link. For example, the entity can include a barcode or other optical reader 38 capable of optically reading or otherwise scanning a machine-readable barcode or the like. Additionally or alternatively, for example, the entity can include a short-range radio frequency (RF) transceiver or interrogator 40 capable of reading machine-readable codes from radio frequency identification (RFID) tags or the like in accordance with RF techniques. As will be appreciated, the means for sharing and/or obtaining data over short-range communication links can be embodied in any of a number of different manners in addition to or in lieu of a barcode reader and RF interrogator, as are well known to those skilled in the art.

Further, the entity capable of operating as a digital pen 12 and/or a computing system 14 can include one or more second digital cameras 42 adapted to image at least a portion, if not all, of the writing surface 18. As explained below, the writing surface can include human-readable information, such as a form identifier, sensed by the pen-enabled computing arrangement 10. And as also explained below, the form identifier can be preprinted on the writing surface within one or more designated "hot spots" or form identification areas contained within specific sub-area(s) of the writing surface. The second digital camera is therefore configured such that the digital camera is capable of imaging at least one form identification area such that the form identifier is capable of being automatically sensed based upon the image, advantageously without user operation of the device to sense the identifier. For example, the second digital camera can be configured to automatically image at least one form identification area when the digital pen is otherwise brought into proximate contact with the writing surface, such as when the digital pen is operated to begin creating a writing stroke.

More particularly, for example, the writing surface 18 can include one or more form identification areas 116 within sub-area(s) of the writing surface at known locations relative to one or more identifiable portions of the writing surface, such as one or more edges of the writing surface. The second digital camera can therefore be configured such that when the digital pen is operated to begin creating a writing stroke anywhere on the writing surface, the second digital camera is capable of automatically imaging at least an identifiable portion (e.g., edge) of the writing surface and a form identification area, and thus, a form identifier. As explained below, with the second digital camera 42 imaging at least a portion of the writing surface 18 including an identifiable portion (e.g., edge) of the writing surface and a human-readable (e.g., text) identifier, the computer program product 28 of the digital pen 12 and/or computing system 14 can be capable of automatically sensing the form identifier based upon the image of the identifiable portion of the writing surface and the location of the identifier relative to that identifiable portion.

According to one embodiment of the present invention, the handwriting input is captured and stored by the handwriting capture interface 20 as a coordinate representation of the movement of the digital pen 12 (writing stylus) relative to a writing surface 18. In accordance with the following description, functions performed by the digital pen may more generally be performed by a writing stylus that may or may not be embodied by the digital pen. Thus, it should be understood that whereas various functions are described as being performed by a digital pen, such functions are more particularly performed by a writing stylus embodied by, or separate from, a digital pen.

More particularly, then, the handwriting capture interface 20 can provide the processing element 22 with a plurality of electronic ink (X,Y) data points representative of the position of the digital pen 12 relative to the writing surface 18 at different points in time. In this context, a stroke is generally defined as a continuous marking by the digital pen beginning with the commencement of contact or other interaction between the digital pen and the writing surface and terminating with the removal of the digital pen from the writing surface. For example, a "c" is generally formed of one stroke, while a "t" is generally formed of two strokes. As illustrated in FIG. 1, for example, a handwritten "B" can be formed of one stroke consisting of many electronic ink data points, the X,Y coordinates of five of which are shown in an exploded inset of FIG. 1.

In addition to or instead of merely accepting free-form handwritten data, the pen-enabled computing arrangement 10 can be adapted to associate user input with one or more objects, entities or the like. For example, the pen-enabled computing arrangement can be adapted to associate user input with one or more packages, database records, entries or the like. Additionally or alternatively, for example, the pen-enabled computing arrangement can be adapted to associate user input with a form, one or more pages of a multi-page form, and/or one or more instances of a form, as such may be embodied by the writing surface 18. As explained below, for example, the pen-enabled computing arrangement can be adapted to associate user input with an instance of a particular traffic citation form issued to a particular offender, an instance of a particular healthcare form for a particular patient, or an instance of a waybill or other form adapted to be tracked. In accordance with embodiments of the present invention, one purpose of the pen-enabled computing arrangement is therefore to identify the object with which the user input is to be associated. For illustrative purposes, the following description depicts the object as a particular preprinted form. It should be understood, however, that the object can comprise any of a number of different types of objects with which user input can be associated, without departing from the spirit and scope of the present invention.

More particularly, for example, the pen-enabled computing arrangement 10 of one embodiment of the present invention is adapted to identify the nature and particular instance of a preprinted form engaged therewith. Several examples of such forms may include a contact list form as shown in FIG. 3, a calendar form, a to-do list form, and a general notes form. Other examples of forms include, for instance, a trip planner form, a memorandum form, an educational form, a training form, an insurance form, a traffic citation form, a healthcare form, an expense accounting form, and a wide variety of other forms consistent with the spirit and scope of the present invention. In these embodiments, the computer program product 28 of the digital pen 12 drives the handwriting capture interface 20 thereof to interface and cooperate with blank paper or certain preprinted forms. Additionally or alternatively, the computer program product of the computing system can at least partially drive the handwriting capture interface thereof to interface and cooperate with the digital pen 12 through the blank paper or certain preprinted forms. Note that while reference is made herein to interaction with a preprinted form, such reference is equally applicable to a blank piece of paper or the display 36 of the computing system 14, such as a touch screen or screen in front of an electromagnetic digitizer that serves as a form, in accordance with the spirit and scope of the present invention.

Thus, according to one embodiment of the present invention, the computer program product 28 of the digital pen 12 or computing system 14 enables the pen-enabled computing arrangement 10 to associate user input with a preprinted form (i.e., object) by sensing, for example, a form identifier (i.e., object identifier) associated with a preprinted form. In such instances, the pen-enabled computing arrangement may be adapted to electronically identify the function and physical page of the preprinted form based upon the form identifier. Additionally or alternatively, for example, the pen-enabled computing arrangement may be adapted to provide the identifier as part of a database record or as a database key or to a database management system. In such instances, the identifier may be referred to as a database or record identifier.

The identifier can be embodied in any of a number of different manners that permit the pen-enabled computing arrangement 10 to identify the instance, function and physical page of the form therefrom. For example, the identifier may comprise or otherwise be encoded within a particular dot pattern sensed by the digital pen 12, a numeric form ID, a barcode, a RFID tag, a particular input field or fields associated with a form type, a form page, or a sub-area on a form. Additionally or alternatively, for example, the identifier may comprise or otherwise be encoded within the particular spatial arrangement of input fields on a form, a voice input, an identifier from a displayed identifier menu or range of displayed identifiers, such as on the display 36 of the computing system. Further, for example, the identifier may be based on a form identifier and one or more other identifiers associated with the digital pen, the computing system 14 and/or the user of the pen-enabled computing arrangement.

Accordingly, once the pen-enabled computing arrangement 10 interfaces with and identifies the preprinted form based upon the form identifier, the pen-enabled computing arrangement is able to associate user input with the preprinted form. More particularly, the pen-enabled computing arrangement is able to interpret and act upon user input (e.g., handwriting input) entered through input fields associated with the preprinted form. In particularly advantageous embodiments of the present invention, the handwriting input is captured and stored by the computer program product of the digital pen 12 and/or computing system 14 as vector-based data including, in some instances, (X, Y) coordinate pairs, temporal factors, tactile factors, and/or other descriptive data characterizing the handwriting input in a manner consistent with the spirit and scope of the present invention.

As shown in FIG. 3, a particular contacts form 100 comprises a writing surface 102, at least one visual identifier 104, and a plurality of fields for receiving data via the digital pen 12, including fields such as for free-form handwriting 106, handwriting for character recognition 108, checkbox fields 110 and/or radio button groups. The fields are generally defined by a series of spatial coordinates so as to generally define a box or circle or other area configured to receive a data input therein corresponding to a particular function. For example, a field labeled "Address" is capable of identifying itself to a user and is expected to receive an input therein with the writing stylus corresponding to the address of a particular contact. In various embodiments discussed below, the pen-enabled computing arrangement 10 is capable of identifying the fields and providing feedback to the user as to a selected field via visual and/or audio or speech synthesis, such as by tone or repeating the field label to the user. Thus, for a given type of form, the fields defined by the writing surface, along with the visual form identifiers, may combine to indicate a function of the form as well as a specific identity should the form comprise multiple pages or should there be multiple pages of one type of form.

As other examples, the form could comprise a medical form, such as a screening visit form (see FIG. 4) or a medical history report form (see FIG. 5). As shown in FIG. 4, a particular medical form 112 comprises a writing surface 114, at least one visual identifier 122, and a plurality of fields for receiving data via the writing stylus 40, including fields such as for free-form handwriting 174 and/or handwriting for character recognition 118, where such fields may be referred to herein as "text boxes." Additionally or alternatively, the form can include fields for mutually exclusive or inclusive markings such as radio button groups 124. Additionally, the form includes a page identifier 120 for identifying a particular page of a multi-page form. As depicted, for example, the field labeled "Protocol Code" is capable of identifying itself to a user and is expected to receive an input therein with the digital pen 12 corresponding to the code of a particular medical study protocol. Like the form illustrated in FIG. 3, in various embodiments, the pen-enabled computing arrangement 10 is capable of identifying the fields and providing feedback to the user as to a selected field via visual and/or audio or speech synthesis, such as by computing system 14 emitting a tone or repeating the field label to the user.

As explained above, the form identifier can be embodied in any of a number of different manners, and as such, the pen-enabled computing arrangement 10 can be operated to sense, identify or otherwise determine the identifier in any of a number of different manners. As described herein, although the pen-enabled computing arrangement may be described as "sensing" an identifier, it should be understood that the term "sense" can be used interchangeably with terms such as "identify," "determine," or the like.

As shown in FIGS. 6a-6f, for example, the form 112 may include one or more form-identification areas 116, such as one or more designated "hot spots," contained within specific sub-area(s) of the preprinted form, where each form identification area may or may not include a human-readable version of the form identifier. In addition to or in lieu of the human-readable form identifier, for example, the form-identification area 116a can include a one or more sets of one or more regions that each uniquely correspond to one or more characters, numbers or the like that may form at least a portion of the form identifier, as shown in FIG. 6a. In this regard, the form-identification area 116a can include a set of regions whereby each region uniquely corresponds to a character, number or the like capable of forming any character, number or the like of the form identifier. Alternatively, the form-identification area 116a can include a number of sets of regions whereby each set includes a region that uniquely corresponds to a character, number or the like capable of forming any character, number or the like of the form identifier.

As shown in FIG. 6b, the form identification area 116b can alternatively include a barcode that includes the form identifier encoded therein. As is well known to those skilled in the art, a barcode comprises a pattern of bars and spaces of varying widths that can represent alpha characters, numeric characters and/or punctuation symbols. In this regard, the form identifier can be encoded within the barcode in accordance with any of a number of different barcode symbologies. Examples of such barcode symbologies include UPC (Universal Product Code)/EAN, Code 39, Code 128, Codabar (Code 27), Code 93, Code 11, Interleaved 2 of 5 Code, Plessey Code, Code 16K, Code 49 and PDF 417.

In another alternative, the form identification area 116 can include an identification pattern (not shown) of dots or other marks printed therein. In such an instance, the identification pattern can encode the form identifier such that the form identifier can be sensed based upon the identification pattern. In a further alternative, the form-identification area 116 can include a link or other selectable element (not shown) that, when actuated, directs the computing system 14 to present an identifier menu or range of identifiers from which the form identifier can be selected, as shown in FIG. 6c. The identification pattern may be in addition to or in lieu of any pattern 16 (see FIG. 1) preprinted on the form 112 for determining a position of the digital pen 12. Thus, for example, the form can include a position-determining pattern printed on the form, and an identification pattern printed in the form identification area. Alternatively, for example, the form can include a single pattern thereon that serves as both an identification pattern and a position-determining pattern printed.

In a further alternative shown in FIG. 6d, the form-identification area 116d can include a RFID tag that includes the form identifier encoded therein such that a short-range RF transceiver (e.g., interrogator 64) can be operated to read the form identifier from the RFID tag. In another alternative shown in FIG. 6e, the form identification area 116e can include one or more fields for receiving initial handwriting input for character recognition (shown overlaid upon a pattern 16 of dots or other markings), where the handwriting input represents the form identifier. In yet another alternative shown in FIG. 6f, the form 112 includes one or, more typically, a plurality of form identification areas 116f that include the human-readable form identifier printed on the form in a manner capable of being imaged, such as by the second digital camera 42 of the digital pen 12. Although the form identification areas of the embodiment of FIG. 6f can be positioned in any of a number of different determinable locations relative to identifiable portions of the preprinted form, in one typical embodiment, the form identification areas are positioned at determinable locations relative to one or more edges, corners, borders or the like of the preprinted form.

As will be appreciated, an object (e.g., form) can include a number of different form elements that are associated with one another, such as one or more identifiers and information relating to the object itself. For example, a form can include a form identifier, and an electronic form definition, such as an XML definition and/or an image representation of a form. The form definition can include, for example, field locations with X and Y coordinates, field identifiers such as questions to be presented to the user, feedback specifications for visual, vibration and/or aural feedback, and constraints for character recognition. In addition to a form identifier and an electronic form definition, a form can include a form element comprising a pattern 16 of machine-readable dots or other markings from which the position of a writing stylus may be determined. Further, a form can include one or more form elements comprising a number of other pieces of information related to the form such as, for example, information associated with fields of the form.

The form (i.e., object) including its associated form elements can be generated, and thereafter provided to or otherwise received by the user, and thus the pen-enabled computing arrangement 10, in any of a number of different manners. Reference is now made to FIGS. 7 and 8, which illustrate a functional block diagram and flowchart of various steps in a method of generating a form (i.e., object), and providing the form to a user, in accordance with one embodiment of the present invention. As shown and described below, the form can be generated and provided to the user by any of a number of different entities. For example, the form can be generated and provided to the user by a first computing arrangement 142. The first computing arrangement can comprise any of a number of different components, elements, devices, assemblies, systems including, for example, the digital pen 12 and/or computing system 14. Alternatively, for example, the first computing arrangement can comprise a variety of other types of computing systems, devices or the like, such as a server computer, mainframe computer, a personal computer, a laptop computer, a workstation or the like, so long as the first computing arrangement is capable of performing the functions described hereinbelow.

As shown in block 145 of FIG. 8, a method of generating and providing a form includes selecting a form. The form can comprise any of a number of different forms, such as those indicated above, and can include a single page or multiple pages. After selecting the form, two or more form elements to include as part of the form are selected in any of a number of different manners including, for example, by graphical user interface (GUI) means, as shown in block 146. For example, an identifier and a pattern 16 of dots or other markings can be selected. In this regard, the identifiers of various forms and/or various pages of such forms can be assigned or otherwise selected in any of a number of different manners. The identifiers can include any of a number of different types of alpha characters (uppercase and/or lowercase), numeric characters, symbols or the like. For example, a number of identifiers can be assigned in accordance with a consecutive numbering scheme whereby the identifiers include one or more numeric characters that increase or decrease from one identifier to the next in a regular or irregular interval, such as 12345, 12346, 12347, 12348, 12349 and 12350. Additionally or alternatively, a number of identifiers can be selected in accordance with a "book and set" numbering scheme whereby the identifiers include one or more numeric characters that identify a particular unit (e.g., book) and one or more sub-units (e.g., sets, sections, etc.) within the respective unit, such as 1001-01, 1001-02, 1001-03 and 1001-04.

In addition to or in lieu of a consecutive numbering scheme and/or a book and set numbering scheme, a number of identifiers can be selected in accordance with a weighted and/or unweighted check-digit or modulus (MOD) numbering scheme (e.g., MOD 7, MOD 9, MOD 10, MOD 11, etc.). Advantageously, by selecting identifiers in accordance with a MOD numbering scheme, the identifiers can include a check digit from which the other digits of the identifier can be verified. In accordance with a MOD 7 scheme, for example, the first n−1 digits of an n digit identifier can be selected in any of a number of different manners. To select the nth digit, then, the number comprising the n−1 digits is divided by the modulus number, i.e., 7, to determine a remainder. For example, if the first four digits (i.e., n−1) of a five digit (n=5) identifier are selected to comprise "2007," and the number 2007 is divided by the modulus, the remainder is determined to equal 5.

After determining the remainder, a check digit, and thus the nth digit of the identifier, can be located within either a descending index (i.e., 01234567) in a divide remainder (DR) variation of the MOD 7 scheme, or an ascending index (i.e., 7654321) in a divide subtract remainder (DSR) variation of the MOD 7 scheme. In the MOD 7 DR scheme, then, the check digit is the same number as the remainder, e.g., 5. In the MOD 7 DSR scheme, on the other hand, the check digit is equal to the difference of the MOD number (i.e., 7) and the remainder, e.g., 7−5=2. Continuing the above example where the first four digits of an identifier are selected to comprise "2007," the fifth digit equals 5 in the MOD 7 DR scheme, for an identifier comprising "20075." Alternatively, the fifth digit equals 2 in the MOD 7 DSR scheme, for an identifier comprising "20072."

As will be appreciated, the MOD 9 and MOD 11 schemes operate on the same principle as the MOD 7 scheme, utilizing modulus numbers 9 and 11 respectively. The preceding description of the MOD 7 scheme is an example of an unweighted scheme. It should be understood, however, that instead of determining the modulus remainder by dividing the first n−1 digits of an identifier by the modulus number, the first n−1 digits can each be weighted. The modulus remainder can then be determined by aggregating the weighted n−1 digits, and thereafter dividing the aggregate by the modulus number. In accordance with one common MOD 10 scheme, for example, the number comprising the first n−1 digits can be weighted by the number 21212121 (alternating 1's and 2's beginning with the rightmost digit). In the example above where the first four digits comprise "2007," then, the first four digits can be weighted, aggregated and divided by the modulus number (e.g., 10) as follows: (2×2)+(0×1)+(0×2)+(7×1)=11/10=1 Remainder 1. Similar to before, a check digit, and thus the nth digit of the identifier, can then be located in accordance with the DR variation (e.g., 1) or the DSR variation (e.g., 10−1=9). Continuing the example, then, the identifier can be selected to equal "20071" in the MOD 10 DR scheme, while the identifier is selected to equal "20079" in the MOD 10 DSR scheme.

In addition to the base characters and/or symbols of the identifiers, one or more of the identifiers can further include one or more additional components such as prefixes and/or suffixes. In this regard, the prefixes and/or suffixes can be appended to base characters and/or symbols to include further useful information, such as information related to one or more of the identifier, form, page of the form, creator of the form, user of the first computing arrangement 412, user of the pen-enabled computing arrangement 10, or the like. For example, a number of identifiers can include a prefix and/or suffix representing a month and/or year of creating the respective form, such as "Ja 12345" or "01 12345" ("Ja" and "01" alternatively representing the month of January). Additionally or alternatively, for example, a number of identifiers can include a prefix and/or suffix representing a state, region and/or country of intended use of the form, such as "NY 1001" ("NY" representing the state of New York). Further, for example, a number of identifiers can include a prefix and/or suffix representing an intended user or group of users of the form, such as "GC 20075" ("GC" representing one or more intended users of the form).

Irrespective of exactly how form elements such as the identifier are selected, the form elements are thereafter associated with one another, as shown in block 148. The association can be made in any of a number of different manners, but in one embodiment, the association is made by means of a lookup table created for the form, or including an entry for the form, where the lookup table identifies the selected form elements as being associated with one another. In such instances, the identifier can be, up to the point of being selected and associated with other form elements, unassociated or otherwise independent of a form. Before, after or as the selected form elements are associated with one another, a piece of stock paper is loaded into a printer 142a coupled to or otherwise associated with the first computing arrangement 142, such as by a user of the first computing arrangement, as shown in block 150. The printer can comprise any one or more of a number of different means for printing in accordance with embodiments of the present invention including, for example, a laser printer, offset press, numbering machine, and/or variable imaging press. As will be appreciated, then, generation of all or portions of the form (i.e., object) can occur in any of a number of different contexts including, for example, commercial printing whereby the first computing arrangement, and thus the printer, is operated or otherwise controlled by a commercial printing entity.

After the stock paper is loaded into the printer, the first computing arrangement 142 can direct the printer to print one or more of the associated form elements, representations of one or more of the associated form elements, and/or information related to one or more of the associated form elements, as shown in block 152. For example, after an identifier and a pattern 16 of dots or other markings are associated with one another, the first computing arrangement can direct the printer to print the identifier and pattern onto the stock paper loaded into the printer 142a. The printer can print the identifier in a form identification area 116 in any of a number of different manners including, for example, in a human-readable (e.g., text) and/or a machine-readable manner (e.g., barcode). Also, to enable the digital pen 12 to thereafter determine its position based upon the printed pattern of dots, the printer prints the pattern of dots in a machine-readable manner, typically resulting in a pattern invisible or barely visible to the user. By printing a form identifier in association with, but not encoded within, a pattern of dots or other markings, the form identifier and pattern are decoupled from one another. Thus, in contrast to conventional systems where unique patterns encode the unique identifiers associated therewith, the first computing arrangement of embodiments of the present invention can utilize the same pattern or a small number of patterns in association with a plurality of, or a larger number of, identifiers, and thus, a plurality of forms or pages of form(s), as explained below.

As indicated above, the identifier can be embodied in a number of different manners, some of which (e.g., RFID tag) may not be conducive to printing by the printer 142a. In such instances, in addition to or in lieu of printing the identifier in a manner capable of being performed by the printer, the identifier may be attached or otherwise affixed to the stock paper in a manner independent of the printer, such as by the user or any of a number of other automatic or manual means. In the case of a RFID tag encoding the identifier, for example, an RFID tag can be attached or otherwise affixed to the stock paper before or after printing any other form elements, representations of those elements and/or information related to those form elements. Before or after affixing the RFID tag, then, the identifier can be encoded within the tag, such as in any of a number of different manners well known to those skilled in the art.

As shown in block 154 and again in block 146, after the printer prints onto the stock paper, two or more form elements to include as part of the form can again be selected, such as by GUI means, if so desired. The selected form elements include at least one form element not otherwise previously selected, but can otherwise include one or more previously selected and associated form element. For example, an electronic form definition can be selected along with a previously selected and associated identifier and pattern of dots or other markings. As shown in FIG. 7, for example, the exemplary form definition 140 comprises that of the screening visit form 112 of FIG. 4. Again, after selecting two or more form elements, the form elements are associated with one another, as shown in block 148. Before, after or as the selected form elements are associated with one another, the printed paper 138 including the previously printed information is loaded into the printer 142a, as shown in FIG. 7 and block 150 of FIG. 8. Alternatively, the selected form elements can be printed at the time of printing the previously selected form elements, after loading stock paper into the printer.

Similar to before, after the printed paper is loaded into the printer 142a, the first computing arrangement 142 can direct the printer to print one or more of the associated form elements, representations of one or more of the associated form elements, and/or information related to one or more of the associated form elements, as shown in block 152. Continuing the example shown in FIG. 7, before printing the form definition, a representation of the form definition or information related to the form definition, the first computing device 142 can load or otherwise select the form definition 140. Then, after printing the dot pattern 16 and the identifier on the stock paper, and after loading the printed paper 138 into the printer, the first computing arrangement can direct the printer to print visual portions of the form onto the printed paper, including the visual identifiers 122 and fields 174, 118, 120 and 124 (see FIG. 4), as shown in block 152. In addition, the first computing arrangement can direct the printer to simultaneously print, along with the visual portions of the form, a reprint 144 of the associated form identifier associated with the form.

Generation of the form can continue by selecting form elements to be included in the form, associating the selected form elements with one another, and printing the associated form elements, representations of one or more of the associated form elements, and/or information related to one or more of the associated form elements. Furthering the above example, generation of the form can continue by further associating information with one or more fields of the form, such as information stored in a database associated with the form. The printed paper 160 including the previously printed dot pattern 16, form identifier and visual portions of the form can then be loaded into the printer 142a, which the first computing arrangement 142 thereafter directs to print the information within the respective fields of the form. Alternatively, the selected form elements can be printed at the time of printing previously selected form elements, after loading stock paper into the printer. Thus, one or more of the form elements, representations of one or more of the associated form elements, and/or information related to one or more of the associated form elements can be printed upon the stock paper at one or more instances.

After printing one or more form elements, representations of one or more of form elements, and/or information related to one or more form elements of the form onto the stock paper, the resulting printed form 112 can be provided to, and utilized by, a user of a pen-enabled computing arrangement 10, such as in a manner explained herein. Before providing the printed form, however, the printed form can be inspected, such as by a user of the first computing arrangement, or by the first computing arrangement itself, as shown in block 156. For example, the printed form can be inspected to ensure the printing is of sufficient quality and that the form was properly printed in accordance with the respective form definition. In addition, by also printing a reprint 144 of the form identifier, the printed form can be inspected to ensure that the form element(s), representations of form element(s), and/or information related to form element(s) printed on the form are associated with the proper identifier, such as by matching the identifier printed in a form identification area 116 of the stock paper with the reprint, and thus the form elements, associated with the printed form.

Generation of the printed form, or portions thereof, can be performed at one or more instances by one or more computing arrangements coupled to one or more printers (including the first computing arrangement 142 and/or one or more other computing arrangements) for one or more forms and/or one or more pages of one or more forms, as shown in block 158, and again by blocks 145-154. In this regard, each form and/or page of a form typically includes a combination of form elements that differ from those of another form and/or page. For example, a number of different forms and/or pages can each include a unique identifier that is associated with a pattern 16 of dots or other markings that may be the same for one or more forms and/or pages. In such an instance, each form may include a different form identifier and form definition while including the same pattern of dots or other markings, if so desired. Whereas a number of different forms and/or pages within one or more forms may include a unique identifier, those same forms and/or pages may include the same pattern of dots or other markings (or a small number of patterns of dots or other markings) as one or more other forms and/or pages. Thus, form identifiers can be decoupled from patterns that conventional systems uniquely associate with form identifiers.

Further, one or more of the preceding steps may be performed for groups of forms before others of the steps are performed for one or more of the forms of the group. For example, a number of unique form identifiers can be selected and associated with one or more patterns 16 of dots or other markings (see blocks 146 and 148). Each unique identifier and associated pattern can then be printed on a separate piece of stock paper, the pieces of stock paper having previously been loaded into a printer 142a coupled to the first computing arrangement 142 (see blocks 150 and 152). In such an instance, all or at least a portion of the identifiers can be associated with the same pattern(s). After printing the identifiers and pattern(s) on the pieces of stock paper, the pieces of printed paper can then be further utilized by the first computing arrangement 142 or provided to one or more other computing arrangements for performing the other steps in generating a preprinted form. For example, the pieces of printed paper can be provided to another computing arrangement that selects one or more forms and/or pages of one or more forms, and associates the form definitions of those selected forms and/or pages with the identifiers/pattern(s) printed on the paper (see blocks 145, 146 and 148).

The printed pieces of paper including the identifiers/pattern(s) can be loaded into a printer associated with the other computing arrangement (see block 150). Then, the other computing arrangement can direct the printer to print, on the pieces of printed paper, one or more of the associated form elements, representations of one or more of the associated form elements, and/or information related to one or more of the associated form elements (see block 152). For example, the other computing arrangement can direct the printer to print visual portions of the form onto the printed paper, including the visual identifiers 122 and fields 174, 118, 120 and 124 (see FIG. 4), as well as a reprint 144 of the associated form identifier associated with the form, if so desired. After printing all of the desired form elements, the printed form can be inspected, such as by a user of the other computing arrangement, by the other computing arrangement itself, or by yet another user or computing arrangement (see block 156). Advantageously, the arrangement may keep a record of which identifiers have been reprinted. After the user interacts with the provided paper, and after handwriting, identifier, and pattern information are transferred to a processing element, the user may select via standard graphical user interface means the identifier corresponding to the paper upon which the user interacted, from the record of reprinted identifiers corresponding to the pattern.

As discussed below, as the user initiates the pen-enabled computing arrangement 10, the user can direct the pen-enabled computing arrangement to sense or otherwise identify a form identifier of a desired form. In this regard, the user may be prompted to operate the pen-enabled computing arrangement, or more particularly the digital pen 12 of the arrangement, to sense the desired form. In such instances, the user may be prompted in any of a number of different manners. For example, the digital pen and/or the computing system 14 may provide an audio (tone, voice message, etc.), vibration and/or visual (on display 36) prompt to thereby direct the user to operate the digital pen to sense the identifier of the desired form. The arrangement may prompt the user at one or more instances before the digital pen senses a form identifier. For example, the arrangement may prompt the user upon powering on the digital pen or initializing operation of the digital pen. Additionally or alternatively, the arrangement may prompt the user at each instance the digital pen receives user input data for a particular form or forms before sensing the respective form identifier(s).

More particularly, for example, presume that the form identification area 116b of a form includes a barcode with the form identifier encoded therein (see FIG. 6b). In such an instance, the digital pen 12 may be initiated in a bar-scanning mode to thereby scan the barcode such that the pen-enabled computing digital pen can digital pen to scan the barcode, then, the computing system 14 may provide vibration feedback, such as by direct the digital pen to vibrate, preferably in a manner capturing the user's attention. Alternatively, the digital pen may direct itself to vibrate to thereby capture the user's attention. In this regard, the processing element 22 of the digital pen, under direction of the computer program product 28, can control a vibration mechanism of the digital pen's user interface 32 to vibrate, and thus prompt the user, at one or more instances before scanning the barcode. For example, the digital pen can be controlled to vibrate immediately upon initialization, or if a predetermined amount of time passes after being initialized but before scanning the barcode. Additionally or alternatively, for example, the digital pen can be controlled to vibrate when the digital pen or handwriting capture interface 20 of the digital pen senses handwriting (for example, by means of a pressure sensitive stylus tip) or other user input independent of a scanned barcode, while the digital pen is operating in a bar-scanning mode to scan such a barcode.

Further, as will be appreciated, the time between consecutive strokes on a particular writing surface 18 is typically shorter than the time between consecutive strokes on different writing surfaces. Thus, in another example, the digital pen 12 can be controlled to vibrate if the digital pen senses the same dot pattern 16 for consecutive strokes but the time between strokes is greater than a predefined, typical time between consecutive strokes on the same writing surface. Such vibration, then, can warn the user that the digital pen may again need to sense an identifier before continuing to capture user input data. Further, for example, the digital pen may be controlled to vibrate when the digital pen senses a new dot pattern (indicating a new writing surface), typically before the digital pen senses a new identifier.

As the form identifier can be embodied in any of a number of different manners, it should be appreciated that the pen-enabled computing arrangement 10 can be operated to sense the identifier in any of a number of different manners. As shown more particularly in FIG. 6a, for example, the user identifies the desired form by using the digital pen 12 to depress the area over the "Begin Identification" region of form-identification area 116a. The user then enters the form identifier, such as the numeric ID "20075," corresponding to the desired form by depressing the regions over the numbers corresponding to the numeric ID. Finally, the user completes the identification of the form by depressing the "End Identification" region. Alternatively, as shown in FIG. 6b, for example, the user identifies the desired form by using the barcode reader 38 of the digital pen or computing system 14 to scan a barcode within form-identification area 116b, the barcode encoding the form identifier. In another alternative, for example, the user identifies the desired form by using the digital pen to sense an identification pattern of dots or other marks (similar to pattern 16—see FIG. 1) encoding the form identifier therein. In a further alternative shown in FIG. 6c, for example, the user identifies the desired form by actuating a selectable element within the form-identification area or otherwise directing the computing system, or more particularly the computer program product 28 of the computing system, to present an identifier menu or range of identifiers, such as in a window 126 on the display 36 of the user interface. The user can then select the respective form identifier from the identifier menu or range of identifiers.

In another alternative shown in FIG. 6d, for example, the user identifies the desired form by operating the short-range RF transceiver or interrogator 40 of the digital pen 12 or computing system 14 to read the form identifier from an RFID tag including the form identifier encoded therein, the RFID tag being included within a form-identification field 116d of the form. In such an instance, by passing the RF transceiver within a predefined distance of the RFID tag and actuating the RF transceiver, the RF transceiver can be made to detect or otherwise read the form identifier output by the RFID tag. In a further alternative shown in FIG. 6e, for example, the user identifies the desired form by using the digital pen to handwrite the numbers corresponding to the numeric ID in fields of form-identification area 116e, the fields being configured to receive initial handwriting input for character recognition.

In yet another alternative shown in FIGS. 6f and 9, for example, the user identifies the desired form by using the second digital camera 42 of the digital pen 12 or computing system 14 to image at least a portion of the form, that portion including at least one form identification area 116a with a human-readable form identifier printed therein. More particularly, when the user operates the digital pen to begin creating a writing stroke anywhere on the writing surface, the second digital camera is capable of imaging at least a portion of the writing surface, the imaged portion of the writing surface including an identifiable portion of the writing surface and a form identification area, and thus, a human-readable form identifier. Upon acquiring the image, the digital pen or computing system can segment the form identifier from the image based upon the identifiable portion (e.g., edge) of the form included in the image and a known location of the form identifier relative to the identifiable portion, the identifiable portion (e.g., edge) being identified by means of any of a number of different known techniques. Then, after segmenting or otherwise determining the location of the form identifier, the digital pen or computing system can convert or translate the image of the form identifier into text or other machine-readable form using, for example, any of a number of different optical character recognition (OCR) techniques or the like. For an example of one technique for segmenting and converting an image of characters into a text or other machine-readable form in the context of identifying license plate numbers from an image including the license plate, see U.S. Pat. No. 6,553,131, entitled: License Plate Recognition with an Intelligent Camera, issued Apr. 22, 2003.

In further alternatives, the user identifies the desired form based upon one or more other form elements associated with the form, such as a preprinted pattern 16 on the form from which the position of the digital pen 12, and thus the writing stylus, can otherwise be determined. For example, the form identifier can be encoded within the preprinted pattern such that the user can identify the desired form by using the digital pen 12 to sense the preprinted pattern, and thus the form identifier encoded therein. Also, for example, the preprinted pattern can be associated with a form identifier, such as by means of a lookup table, as explained above. In such instances, the user can identify the desired form by using the digital pen 12 to sense the preprinted dot pattern, and identifying the form identifier associated with the sensed preprinted in the lookup table.

In various instances of sensing the form identifier, the pen-enabled computing arrangement 10 can directly sense the numbers corresponding to the form identifier, such as from the depressed regions over the numbers corresponding to the numeric ID (see FIG. 6a), from the barcode encoding the form identifier (see FIG. 6b), from the identifier selected from the identifier menu or range of identifiers (see FIG. 6c), and/or from a preprinted dot pattern 16 encoding the form identifier. In other instances such as when the form identifier is sensed based upon handwriting input (see FIG. 6d), from an image (see FIG. 6f and FIG. 9) or from a preprinted dot pattern associated with the form identifier, the arrangement is configured to process input data to thereby sense the form identifier. More particularly, in the case of handwriting the numbers corresponding to the numeric ID in fields of the preprinted form for character recognition, the digital pen 12 or the computing system 14 of the arrangement may be configured to convert or translate the handwriting input into text form using, for example, an automatic on-line handwriting recognizer or other translation system. The arrangement can then sense the numbers corresponding to the form identifier from the converted handwriting input.

To more accurately convert the handwriting input into text form, the pen-enabled computing arrangement 10, or more particularly the computer program product 28 of the digital pen 12 or computing system 14, can translate the handwriting input of each number into a number of alternative text representations of the number according to one or more on-line and/or raster image based handwriting recognition or translation methods. In addition, the computer program product can be configured to determine a confidence value associated with each text representation of the number. For each number, the computer program product can then combine the confidence values associated with the alternative text representations from the various recognition or translation methods. The combined confidence values for each text representation of the number can then be compared to determine the text representation with the highest confidence value. If the highest confidence value meets a predefined threshold, the associated text representation may be accepted by the computer program product as the text representation of the respective number. Otherwise, the computer program product may fail to recognize the respective number.

Irrespective of the exact manner in which the pen-enabled computing arrangement 10 senses the form identifier, the arrangement may determine if the identifier is known or otherwise proper, such as during the sensing of the form identifier. If the arrangement recognizes a known or otherwise proper form identifier, the arrangement will act accordingly as described below, and may additionally provide feedback, such as a voice synthesis and/or visual (on display 36) message (e.g., "20075—record loaded"). On the other hand, if the pen-enabled computing arrangement does not recognize a known or otherwise proper form identifier, the arrangement will act accordingly and may provide feedback, such as a voice synthesis message (e.g., "record not found") and/or vibration feedback. For example, when the form identifier is selected in accordance with a MOD scheme, the pen-enabled computing arrangement may fail to recognize a proper form identifier when the last (i.e., nth) digit of the form identifier sensed by the pen-enabled computing arrangement 10 does not match the proper check digit of the identifier. In such instances, the proper check digit can be determined by the computing arrangement, such as in the same manner indicated above for determining the check digit. Additionally or alternatively, the check digit can be sensed by the pen-enabled computing arrangement, such as in accordance with any of the different techniques identified above for sensing the form identifier (e.g., encoding the check digit in a preprinted pattern of dots or other marks within the form identification area 116).

In addition to or in lieu of providing feedback, the computing arrangement 10, or more particularly the computer program product 28 of the computing system 14, may be triggered to verify or otherwise solicit verification of the form identifier when the pen-enabled computing arrangement does not recognize a known or otherwise proper form identifier. For example, the computer program product 28 of the computing system may be triggered to notify the user of its failure to recognize a known or otherwise proper form identifier, such as by providing aural, visual and/or vibration feedback, where such notification prompts the user to verify the identifier. Additionally or alternatively, the computer program product may also present the improper form identifier sensed by the arrangement. The user may then be capable of verifying the sensed form identifier and, if appropriate, altering one or more numbers, characters or the like of the form identifier such that the computer program product recognizes a known and/or otherwise proper form identifier.

More particularly, for example, presume the computer program product 28 of the digital pen 12 or computing system 14 successfully converts four numbers of a five number form identifier, those numbers being converted into an understandable text form from corresponding handwriting input. However, the computer program product fails to convert the fifth number, and thus, fails to recognize the entire form identifier as a known or even a proper five number form identifier. In this regard, the computer program product can fail to convert a number in any of a number of different instances, such as when a confidence value determined by the computer program product and associated with the number is below a predefined threshold, as explained above. Upon failing to convert the fifth number, the computer program product 28 of the computing system 14 can be triggered to present a rendering 128 of the handwriting input received by the arrangement from the user, such as in a window 130 on the display 36 of the user interface, as shown in FIG. 10. In the same or a different window, the computer program product of the computing system can also present the text form 132 of the converted handwriting input, such as underneath the corresponding handwriting input. Then, underneath the number the computer program product failed to recognize, the display can present a field 132*a* for receiving, from the user, the fifth number of the form identifier. Additionally, the user can modify, and the computer program product can receive modification of, one or more of the numbers in text form, such as in instances in which the computer program product incorrectly converted the respective handwriting input, as shown in field 132*b* when the identifier is "20075." The computer program product can receive the unconverted number and/or modification of converted number(s) in a number of different manners including, for example, by means of the keyboard of the user interface 34 of the computing system. From the text form of the numbers converted from the handwriting input, and the fifth number received thereafter, the computer program product may then recognize a known or otherwise proper form identifier. Otherwise, the computer program product may be again triggered to verify or otherwise solicit verification of the form identifier.

Generally, the user interacts with the form according to the user-identified function imparted by the visual identifiers 104, 122, again referring to FIGS. 3 and 4. The user then typically inputs data within the separate fields according to the functions thereof. The user may additionally input data outside the fields of the form, however, particularly if the data comprises free-form handwriting input. Typically, as the data is input into a field, it is spatially referenced with respect to the box defining the field. For example, data input into a "Name" field may be referenced to the leftmost vertical boundary or possibly a combination of the leftmost vertical boundary and the lowermost horizontal boundary. Thereafter, data input into an "Address" field may be referenced to the leftmost vertical boundary of the address box, which also corresponds to the rightmost vertical boundary of the name field. Thus, it is understood that data input into defined fields on a form according to the functions thereof may be spatially referenced so as to be indicative of the nature of the form. It should also be understood that spatial representation of fields disposed on a form can also serve to differentiate between different types of forms. In order to add more specificity to the identification of a form, various fields may also be spatially disposed so as to define a unique code over other forms. For example, checking the appropriate fields on a daily scheduler form for a month and day differentiates the particular form from daily scheduler forms for other days throughout the year. Further details of the interaction between the pen-enabled computing arrangement 10 and a preprinted form, according to some embodiments, are found in U.S. patent application Ser. No. 09/540,469 to Clary, entitled System, Computer Program Product, Computing Device, and Associated Methods for Form Identification and Information Manipulation, filed Mar. 31, 2000, the contents of which are hereby incorporated by reference in its entirety.

Once the handwriting input is determined from the digital pen 12 position and the usage of the fields of the preprinted form, the computer program product 28 of the digital pen and/or computing system 14 is capable of assessing and separately processing the input data based upon the associated form identifier, as well as the type of input, whether free-form handwriting input, handwriting input for character recognition, checkbox or radio button data, or some other form of input data. According to embodiments of the present invention wherein the handwriting input corresponds to that for character recognition, the computer program product may also convert or translate the handwriting input into text form using, for example, an automatic on-line handwriting recognizer or other translation system. However, in other embodiments, the handwriting input may be stored and further utilized without conversion into text, such as wherein the handwriting input corresponds to free-form handwriting, for example. Additionally, or alternatively, the computer program product may compress the handwriting input for easier storage, processing and/or transmission, particularly where the handwriting input is free-form handwriting and may comprise a large number of electronic ink data points. Such compression is described in further detail in U.S. Pat. No. 6,741, 749 entitled System, Device, Computer Program Product and Method for Representing a Plurality of Electronic Ink Data Points, issued May 25, 2004, assigned to Advanced Digital Systems, Inc., and hereby incorporated by reference in its entirety. In still further instances, the handwriting input, whether free-form or for character recognition, may be stored in its original form, in addition to possibly being converted to text form and stored by the computer program product, wherein either form, or both forms, of the handwriting input may be further utilized by the pen-enabled computing arrangement 10.

In instances in which the input data corresponds to checkbox or radio button selections, the computer program product 28 of the digital pen 12 or computing system 14 can store the result of whether the checkbox has been checked or the radio button has been selected based on the spatial coordinates of the handwritten input and rules of logical exclusion or inclusion. If, after a checkbox or radio button has been selected, the user makes a new mark on the checkbox or radio button, the pen-enabled computing arrangement 10 can provide feedback to the user, such as visual and/or audio or speech synthesis, to indicate that a selected checkbox or radio button as been reselected. Making a new mark in the checkbox and or radio button can also toggle the state of the stored result. For example, an additional mark on a selected checkbox causes that checkbox to be deselected. Alternatively, the new mark can select again a previously selected checkbox or radio button to thereby add to the previous selection, such as in cases where each checkbox mark increments a count of the number of times the user has selected the checkbox. In embodiments where the new mark selects a previously selected mark again, the checkbox or radio button can be deselected, or "scratched-out," with at least one stroke over the checkbox or radio button. Thus, adding to or changing a selection can allow the state of the stored result to be consistent with the visual feedback on the preprinted form and/or the display 36 of the computing system.

Some embodiments of the present invention may also allow the data fields to be alterable by the user. For example, the present invention may allow the user to alter a field for free-form handwriting into a field for handwriting for character recognition, and vice versa. In addition, the computer program product 28 of the digital pen 12 and/or computing system 14 may have the ability to time and/or date stamp any data entries as they are input into the pen-enabled computing arrangement 10. The processing element 22 of the digital pen and/or computing system is then able to process these data fields with respect to the time and/or date stamp tags. As these functions are executed, the computer program product also controls the user interface such that information relevant to ongoing digital pen 12 or computing system activities can be displayed for the user, as described below. The digital pen and/or the computing system may provide aural, vibration and/or visual information to the user, including, for example audio tones or waveforms or speech synthesized voice messages or associated displays. In a particularly advantageous embodiment, the computer program product is also capable of formatting, sending, receiving, and interpreting messages received, such as via the communication interface 30 and/or a RF transceiver.

FIGS. 11a and 11b illustrate flowcharts including various steps in a method of processing a form based on, or producing a contextual electronic message from, an input or inputs to a pen-enabled computing arrangement 10 according to one embodiment of the present invention. For more information on various steps of the illustrated method, see U.S. patent application Ser. No. 10/059,478, entitled: System, Computer Program Product, and Method for Capturing and Processing Form Data, filed on Jan. 29, 2002, published on Aug. 8, 2002 as U.S. Patent Application Publication No. 2002/0107885, the '885 application being assigned to Advanced Digital Systems, Inc. and hereby incorporated by reference in its entirety. According to embodiments of the present invention and as used herein, the term "contextual electronic message" refers to an electronic message formed on the basis of the particular preprinted form used within the pen-enabled computing device and the context of the handwriting input, such as the function of the form (e.g., "traffic crash report form"), a particular free-form comment, a particular text input field and/or a particular multiple choice question. For example, if a page from the contacts form 100 illustrated in FIG. 3 comprises the preprinted form and the handwriting input is an entry for a particular contact on that page, the context of the handwriting input may be a name, address or e-mail, a phone number, or a checkbox corresponding to whether to contact a respective entry, wherein the title (e.g., "Name," "Address" and/or "E-Mail") and related fields may correspond to visual identifiers 104 on the preprinted form. In accordance with various embodiments of the present invention, context may be affected by, for example, the particular form and/or sub-area thereof manipulated by the digital pen 12, the user profile, characteristics of the message recipient, the particular series and/or order therein of user actions, and/or the characteristics of the user actions.

The content of the contextual message can be handwritten information such as, for example, a particular free-form comment, a particular text input field, predefined text and/or a particular multiple choice question. In addition, the content of the contextual message can include additional data that is related to or associated with the handwritten information. For example, this additional data can include additional text, such as one or more standard or predefined paragraphs or the text of an entire letter. Similarly, the additional data can include predefined audio, predefined video, links to web sites, photographs, pictures, or other images, letterhead, stationery or the like.

Again referring to FIGS. 11a and 11b, a user of a pen-enabled computing arrangement 10 may first perform an initiating action to initiate the creation of a contextual electronic message or forms processing by the arrangement, as shown in block 200. For example, the user may use the digital pen 12 to check a messaging box contained within a specific sub-area of the writing surface 18 of the preprinted form. Alternatively, the user may circle one or more fields contained within a specific sub-area of the preprinted form. In still another embodiment of the present invention, the user may select an electronic messaging icon that exists on the preprinted form such as, for example, an envelope icon appearing on the form, wherein each distinct sub-area of the form could have its own messaging icon. Further, in yet another embodiment of the present invention, the user may be required to activate a control button on the user interface 32 of the digital pen or computing system 14 associated with the initiation of an electronic message. The user may, for example, be prompted by the user interface to select a messaging or forms processing option using associated control buttons, such as an open-file button 300, as shown in FIGS. 12, 13 and 14. Further details of the initiation of a contextual electronic message, according to some embodiments, are found in U.S. Pat. No. 6,826,551, entitled: System, Computer Software Program Product, and Method for Producing a Contextual Electronic Message From an Input to a Pen-Enabled Computing System, issued Nov. 30, 2004, assigned to Advanced Digital Systems, Inc., and hereby incorporated by reference in its entirety.

If so desired, the pen-enabled computing arrangement 10 may prompt the user by audio (tone, voice message, etc.), vibration and/or visual (on display 36) means to thereby direct the user to operate the pen-enabled computing arrangement to identify a desired form for the creation of a contextual electronic message or forms processing, as indicated above. For example, the pen-enabled computing device may provide a prompt to thereby direct the user to operate the pen-enabled computing arrangement, or more particularly the digital pen 12, to sense the identifier of the desired form. The arrangement may prompt the user at one or more instances before the arrangement senses a form identifier such as, for example, before and/or after the user performs an initiating action to initiate the creation of a contextual electronic message or forms processing. Then, if the user attempts to input data before the pen-enabled computing arrangement senses a form identifier, the arrangement may again prompt the user at one or more instances until the arrangement senses a form identifier.

If the pen-enabled computing arrangement 10 successfully senses a known or otherwise proper form identifier, the user may thereafter interact with the arrangement to effectuate the creation of a contextual electronic message or forms processing by the arrangement. Otherwise, if the arrangement does not sense a known or otherwise proper form identifier, the device may be may provide feedback, such as by means of the computing system 14 emitting a voice synthesis message (e.g., "record not found"). Additionally or alternatively, as indicated above, the arrangement may be triggered to verify or otherwise solicit verification of the form identifier. For example, the computer program product 28 of the computing system 14 may be triggered to notify the user of its failure to recognize a known or otherwise proper form identifier, and may also present the improper form identifier sensed by the device. The user may then be capable of verifying the sensed form identifier and, if appropriate, altering one or more numbers of the form identifier such that the computer program product recognizes a known or otherwise proper form identifier. Then, after the arrangement successfully senses a known or otherwise proper form identifier, the user may interact with the arrangement.

During the interactions with the pen-enabled computing arrangement 10, including interactions between the digital pen 12 and the writing surface 18 of the form, the arrangement may provide aural, vibration and/or visual feedback to the user. Feedback may be given by the arrangement when the digital pen position input corresponds to predefined spatial areas. In such situations, the computer program product 28 of the digital pen or computing system 14 is capable of recalling library and/or toolkit functions (e.g., those provided by a text-to-speech engine and/or those that play audio files) and producing aural (e.g., voice) or visual (e.g., graphical user interface (GUI)) feedback to the user. For example, as illustrated in FIGS. 12, 13 and 14, the computing system of the arrangement may provide visual feedback to the user by displaying one or more form identifiers, such as a page identifier 302, form identifier, a thumbnail rendering 304 and/or a partial or full view 320 of the preprinted form on the display 36 once a recognized form has been identified. In addition, the display presented to the user may scroll to present information to the user, such as a question corresponding to the stylus position and corresponding choices for that question. In addition, or in the alternative, in embodiments wherein the pen-enabled computing arrangement includes the audio mechanism and/or vibration mechanism, the digital pen may provide vibration and/or an audio tone, and/or the computing system may provide an audio tone or voice message, according to the position of the digital pen to indicate whether a recognized preprinted form has been identified. And in some embodiments, the computing system may provide a voice message indicating that a preprinted form has been identified and/or the name of the identified form. In addition, the voice message may be synthesized based on text or other data stored in the predefined form definition. For example, a name or label associated with an input field may be spoken by the pen-enabled computing arrangement when the digital pen activates that field.

Once the user initiates the processing of a form, the computing system 14 of the pen-enabled computing arrangement 10 can, but need not, create and format the desired form in volatile storage 26, such as by loading the corresponding form definition, as shown in block 204 of FIG. 11*a*. In addition to loading the form definition, the computing system can present, on its display 36, a thumbnail rendering 304 of the identified form as shown in FIG. 12, and/or a partial or full view 320 of the identified form as shown in FIGS. 13 and 14. The form, embodied by the writing surface 18 and specified by a form definition, may include one or more sub-areas containing parameters indicating the type of form, a page number of the form, or the type of field within the form, which may advantageously be human readable. The user can input the human readable parameters within input fields on the form by means of the digital pen 12, and/or within areas presented by the display 36 of the computing system 14, possibly to identify the form, page or instance to the device. In one particularly advantageous embodiment of the present invention not illustrated, the user can modify the contents of the form by interacting with the pen-enabled computing arrangement through the digital pen and/or the user interface components comprising, for example, an interactive display, appropriate control buttons, or the like.

After the pen-enabled computing arrangement 10 has initiated the processing of a particular form, the pen-enabled computing arrangement is then able to act on the input data, such as data input into the fields associated with the form or data input around the fields, such as free-form handwriting input. Whereas free-form handwriting input may be input in the margins of the writing surface 18 of the preprinted form, as well as within fields, reference herein will be made only to data input into fields. It should be understood, however, that inputting data into fields includes all data input with respect to a preprinted form. The user may then begin inputting data into a field on the writing surface of the preprinted form. Alternatively or additionally, in embodiments wherein the user interface of the computing system 14 includes a touch screen, screen with an electromagnetic digitizer, mouse, keyboard or the like, the user may input data into fields using the touch screen, screen with an electromagnetic digitizer, mouse, keyboard or the like of the user interface. As the user inputs handwritten, input data into the preprinted form using the digital pen 12, the handwriting capture interface 20 of the digital pen can capture the data and provide a series of data points, typically represented by X and Y coordinate points, indicating the depressed digital pen and representative of the position of the digital pen at a plurality of successive instances in time. Alternatively, the digital pen may only capture provide a single data point representative of the position of the digital pen at one instance of time, such as could be the case in instances in which the input data comprises a checkbox or radio button selection.

As the handwriting capture interface 20 of the digital pen 12 accepts each piece of data, the digital pen and/or computing system 14 of the pen-enabled computing arrangement 10 may provide an audio, vibration and/or visual feedback to the user. For example, as the user inputs handwriting input, the computing system may provide a rendering of each character 306 or stroke 316 on the display 36 of the computing system, such as within the thumbnail 304 of the form shown on the display. Additionally or alternatively, for example, the digital pen and/or computing system may provide an audio tone or voice message corresponding to whether the handwriting capture interface has accepted the data and/or the content of the data. Further, for example, the digital pen may provide vibration feedback corresponding to whether the handwriting capture interface has accepted the data. In one such scenario, the digital pen may provide vibration feedback if the digital pen fails to capture data, such as when the position-determining pattern 16 of dots or other markings is improperly printed upon the form.

To define the feedback provided by the digital pen 12 and/or computing system 14, the digital pen and/or computing system may include, stored within the nonvolatile memory 26, a set of predefined rules, such as business logic or other rules, as such are known to those skilled in the art. As the user inputs data, the processing element 22 of the digital pen and/or computing system may monitor the data captured by the digital pen and warn the user via visual, vibration and/or aural feedback if the predefined rules are violated. For example, a predefined rule may state that if the user activates a checkbox corresponding to "Lacks vision in either eye" on a medical history form (see FIG. 5), and subsequently fails to activate the checkbox corresponding to "Eye trouble," a business rule violation has occurred. Additionally, the digital pen and/or computing system may block the user from updating a database or transmitting the data if the rules have been violated.

Depending on the field or location where the user input the data, the computer program product 28 of the digital pen 12 and/or computing system 14 can assess whether the data corresponds to handwriting input for character recognition, free-form handwriting input or a checkbox or radio button selection, as shown in blocks 208, 212 and 216 of FIG. 11a. If the handwriting input corresponds to a checkbox or radio button selection, the computer program product records the selection, as shown in block 210. Additionally, the computer program product may store the chosen selection. The display 36 of the computing system may present the identifier for the field, such as a question on the form to be answered 310, along with the possible selections 312, such as answers to the question. Also, the display may provide a visual confirmation of the identifier for the data field and the selected response 314. Additionally, or alternatively, the digital pen and/or computing system may provide an audio response that a selection has been made, as illustrated in block 224 of FIG. 11b. If the handwriting input is free-form handwriting, the computer program product can capture the handwriting input from the handwriting capture interface as a series of electronic ink data points, as shown in block 214 of FIG. 11b. The display of the computing system, in turn, may display a rendering of the free-form handwriting input 316 on the thumbnail of the form and/or provide audio or vibration feedback to the user, as again shown in block 224.

If the data corresponds to handwriting input for character recognition, the computer program product 28 of the digital pen and/or computing system 14 can convert or translate the handwriting input into text form using, for example, an automatic on-line handwriting recognizer or other translation system, as shown in block 216 of FIG. 11a, and blocks 220 and 222 of FIG. 11b. Additionally, the computer program product can translate the handwriting input of each number into a number of alternative text representations of the number according to one or more on-line and/or raster image based handwriting recognition or translation methods, with each being associated with a confidence value, as before. Then, the accepted test representation of the handwriting input can be determined based upon the confidence values, such as in the same manner as before. Although the digital pen and/or computing system can convert the handwriting input into the text representation, it should be understood that the one or both of the digital pen and computing system need not so convert the handwriting input. In this regard, the digital pen and/or computing system can store, transmit and/or otherwise process the handwriting input for character recognition for later viewing and/or conversion by another device, and/or for manual entry by a data entry operator. For example, the digital pen can transmit such handwriting input to the computing system for later viewing and/or conversion by the computing system.

Once the computer program product 28 of the digital pen 12 and/or computing system 14 identifies the data, the display 36 of the computing system can provide feedback to the user, such as by providing a rendering of the input characters 325 on the thumbnail 304 of the form. The digital pen and/or computing system may also provide audio feedback in the form of a tone indicating data has been accepted and/or a voice message indicating the character recognized, which may include speech that represents the selection, again as shown in block 224. Additionally or alternatively, the handwriting input, and possibly text output and/or the associated confidence value, may be compressed and/or stored and further utilized by the digital pen and/or computing system, such as by transmission to the other of the digital pen and/or computing system or to a third computing arrangement to perform additional conversion or translation on the input, for example, using either on-line or off-line handwriting recognizers, or a combination of such recognizers, as shown in blocks 226 and 228. After the computer program product has assessed and processed the data, the digital pen awaits for further input, such as in other fields of the writing surface 18 associated with the preprinted form or other pages associated with a multi-page form, as shown in block 230. If the user inputs further information, the computer program product assesses the additional information in a manner similar to before.

Whereas the display 36 of the computing system 14 (and/or second or third computing arrangements, explained below) may comprise many different configurations, FIGS. 12, 13 and 14 illustrate three such configurations. It should be understood, however, that FIGS. 12, 13 and 14 are merely illustrative of three types of display configurations and should not be construed to limit the available types of display consistent with the spirit and scope of the present invention. The display comprises a plurality of windows situated throughout the area of the display. As shown in FIG. 12, for example, the display includes a thumbnail window 304 that displays a thumbnail rendering of the identified form. As and/or after the user inputs handwritten data, the computer program product 28 updates the thumbnail rendering with the input and/or a representation of the input, whether handwriting input for character recognition 306, free-form handwriting input 316, checkbox input or radio button selection input. The display also includes at least one form identifier, such as a page identifier 302 to designate each page of a multiple page form. The display of the computing system includes a scroll-down window 318 that displays an enlarged view of some or all of the fields of the form as the user selects a field. The window is capable of scrolling up or down depending on the location of the selected field, however, the window need not scroll at all if the form is of such size that all fields can be displayed legibly within the window. As the user selects a field on the form, the display may also include an exploded view window 314 that includes an exploded view of the current, selected field, and may include the contents of the input data as the user inputs such data into the pen-enabled computing arrangement.

In the display 36 of FIGS. 13 and 14, in addition to at least one identifier (e.g., page identifier 302), a partial or full view window 320 is included to present a partial or full view of the identified form. As and/or after the user inputs handwritten data, the computer program product 28 can update the partial or full view with the input and/or a representation of the input, whether handwriting input for character recognition, freeform handwriting input, checkbox input or radio button selection input. As shown more particularly in FIG. 13 with respect to handwriting input for character recognition, the computer program product updates the partial or full view with the handwriting input. In contrast, in the corresponding view of FIG. 14, the computer program product updates the partial or full view with the text representation of the handwriting input, as converted or otherwise translated by the computer program product.

The display 36 of FIGS. 13 and 14 also includes a window 322 that displays fields of the form including any input data associated with low confidence values (i.e., confidence values below a given threshold), and/or any input data violating one or more business rules. To permit the user to correct, modify or otherwise update one or more of the fields with low confidence values or violating a business rule, or more generally any fields of the form, the display includes a verification window 324, where the field(s) shown in the verification window may be selected from a listing of form fields included within a form field window 326. In the case of handwriting input for character recognition, for example, the verification window includes a rendering 328 of the handwriting input, presented in a manner similar to that shown in FIG. 10. In addition, the verification window can include the text form 330 of the converted handwriting input, within which the window can include one or more fields for receiving any unconverted handwriting input. To further permit the user to modify any converted handwriting input, such as handwriting input incorrectly converted, the characters of the text form can be presented in selectable fields 330a capable of receiving user input, such as by means of the keyboard of the user interface 34 of the computing system.

When the user has finished inputting all the data for a particular form or forms, the user may save the data within the digital pen 12 and/or computing system 14, such as within the non-volatile storage device 26 of the respective entit(ies), as shown in blocks 236 and 238 of FIG. 11b. Additionally, or alternatively, the digital pen and/or computing system may automatically save the data at certain time intervals. Also, once the user has finished inputting all the data for a particular form or forms, the computer-program product 28 of the digital pen and/or computing system collects all of the data and packages it together, including, for example, the form identifier, page identifier, an instance/session identifier, a user identifier, date and time stamp information, selected checkboxes and/or radio buttons, compressed free-form handwriting, compressed handwriting input for characters recognized, characters recognized from character recognition input and/or the confidence values associated with the recognized characters, as shown in block 232. While the data can be packaged in any number of formats, in one particularly advantageous embodiment, the computer program product packages the data into the Extensible Markup Language (XML) format. Formats such as the XML format facilitate a standard inter-computing systems data exchange, such as with healthcare and insurance computing systems. This packaged data can be used by the digital pen and/or computing system to create user-defined reports based upon the input data and the associated form, and can include the associated data in reports incorporating previously processed data associated with the same form, such as a running report of several entries in a particular form or field, as shown in block 234.

Additionally, the digital pen 12 and/or computing system 14 can transmit the packaged data to the other of the digital pen and/or computing system, and/or an external component for further processing of the packaged data, such as further formatting, interpreting and otherwise processing the packaged data, as shown in blocks 240 and 242. More particularly, for example, the digital pen can transmit the packaged data through the communication interface 30 to the computing system for further processing of the packaged data.

FIG. 15 illustrates a system that includes a second computing arrangement 390 (e.g., digital pen 12 and/or computing system 14) capable of transmitting handwritten information to a third computing arrangement 400. In one typical embodiment, for example, the second computing arrangement comprises the digital pen 12, while the third computing arrangement comprises the computing system 14. Additionally or alternatively, the third computing arrangement can comprise a server that is adapted to receive the handwritten data transmitted by the second computing arrangement and to thereafter process the handwritten data. Further, for example, the third computing arrangement can be any of a variety of other types of computing systems, devices or the like, such as a mainframe computer, a personal computer, a workstation or the like, so long as the third computing arrangement is capable of performing the functions described hereinbelow.

Typically, the third computing arrangement 400 is adapted to further store, transmit messages, maintain a database, and/or create form definitions related to packaged data. In this regard, the third computing arrangement includes at least one database 450 or at least one interface to at least one database, such as local and/or external databases, for maintaining a set of known form definitions and associated data, such as previously packaged data from known forms. As such, the third computing arrangement can identify the form that the user has completed from among the set of known form definitions based on the form identifier provided by the second computing arrangement 390. The third computing arrangement can then store the packaged data in the database for later viewing or transmitting, such as over the Internet, for example. Additionally, the third computing arrangement can also maintain the database by accepting new or updated form definitions and/or updated versions of the computer program product of the second computing arrangement, with the third computing arrangement capable of updating the second computing arrangement with the new or updated definitions and/or updated computer program product. As such, a user of the second computing arrangement is capable of filling out the new and/or updated forms associated with the new and/or updated form definitions updated by the third computing arrangement. In this regard, in some embodiments the third computing arrangement can additionally function as a system integrity regulator to thereby ensure that the second computing arrangement contains the current, updated computer program product and/or form definitions before the second computing arrangement processes and/or transmits data.

In various embodiments, the third computing arrangement 400 may also serve to allow a user to create the form definitions that will thereafter be stored in the database 450 and used by the second computing arrangement 390 and/or the third computing arrangement. In this regard, the third computing arrangement may include a computer program product (not illustrated). The computer program product may include a GUI compatible with any number of computing devices, such as a web interface or personal computer application. The computer program product is capable of allowing the user to create form definitions including field locations with X and Y digitizer coordinates, field identifiers such as questions to be presented to the user of the second computing arrangement, feedback controls for visual, vibration and/or aural feedback, and constraints for character recognition. Additionally, the third computing arrangement may be capable of accepting existing forms, such as forms scanned into the third computing arrangement, wherein the computer program product associated with the third computing arrangement will allow the user to use the existing forms as the basis for form definitions.

Additionally, or alternatively, the third computing arrangement 400 may transmit messages including a contextual electronic message derived from the packaged data to a variety of remote devices, such as a personal computer 430, a facsimile machine 420, an e-mail server 460, a PDA, a PCS or other computing device 410 having e-mail, facsimile, or instant messaging capability, such that the intended recipient can receive and view all of or parts of the form including parts of the packaged data. In addition, or in the alternative, remote devices such as the personal computer may be used to create the form definitions stored in the database in a manner similar to that provided above with respect to the third computing arrangement.

The first and third computing arrangements 390 and 400 and, in turn, the third computing arrangement and the remote devices can communicate in a variety of different manners. For example, the first and third computing arrangements can communicate wirelessly, such as by means of a wireless local area network (LAN) or a wireless wide area network (WAN). In this regard, both the second and third computing arrangements can include transceivers for wirelessly transmitting handwritten data. Alternatively, the second and third computing arrangements can be connected via a conventional wired LAN or wired WAN or by any other wired connection. As such, both the second and third computing arrangements can include external device interfaces for supporting the wired connection. As will be apparent to those skilled in the art, the second and third computing arrangements may be configured to communicate directly or may communicate indirectly via one or more intermediate computing devices, such as the intermediate personal computer 440, depicted in FIG. 15, or intermediate smart devices, servers or the like, not illustrated.

In addition to being capable of being interconnected by a variety of different manners, the second and third computing arrangements 390 and 400 can communicate by any of a number of different communications protocols, although standard Internet communication protocols are typically preferred. Similarly, the third computing arrangement is capable of communicating with the remote devices by any of a number of different manners, such as via wireless connections or wired connections as illustrated in FIG. 15. Furthermore, the third computing arrangement can communicate with the remote devices according to any of a variety of communications protocols, although standard Internet communications protocols are also preferred. Additionally, while the system depicted in FIG. 15 illustrates a third computing arrangement that communicates with a variety of remote devices, the system may be designed such that the second computing arrangement communicates directly with one or more remote devices such that the remote device and the third computing arrangement are one and the same.

Referring to FIGS. 16a-16f, in operation, the third computing arrangement 400 receives the packaged data from the second computing arrangement 390, as shown in block 500. Whereas FIGS. 16a-16f and the description herein refer to the third computing arrangement, it should be understood that any of the functions performed by the third computing arrangement can additionally, or alternatively, be performed by a remote device, such as the personal computer 430, without departing from the spirit and scope of the present invention. The packaged data can include, for example, the form identifier, page identifier, an instance identifier, a session identifier, a user identifier, date and time stamp information, selected checkboxes or radio buttons, compressed free-form handwriting, compressed handwriting input for character recognition, and/or characters recognized from character recognition input.

The third computing arrangement 400, in turn, includes a processing element, such as a central processing unit, for further processing of the packaged data. In one embodiment, before the third computing arrangement receives and processes the packaged data, however, the third computing arrangement authenticates the user of the second computing arrangement, as shown in block 502. The authentication can comprise any number of known methods, such as providing a username and password to the third computing arrangement. If the third computing arrangement fails to authenticate the user, the third computing arrangement will indicate such failure to the second computing arrangement such that the second computing arrangement can notify the user, such as by visual and/or audio response in a manner similar to that described above, as shown in block 504. If the user of the second computing arrangement 390 is authenticated, the third computing arrangement begins to process the packaged data by parsing the collected data into the different types of data, including form identifiers, page identifier, an instance identifier, a session identifier, a user identifier, date and time stamp information, as shown in blocks 506 and 508. Further, the third computing arrangement can parse character recognition data including a compressed representation of the handwriting input for character recognition verification and the characters recognized by the pen-enabled computing arrangement 10, selected checkboxes and radio buttons, and compressed free-form handwriting input, as shown in blocks 510, 512 and 514.

Figure 16A:
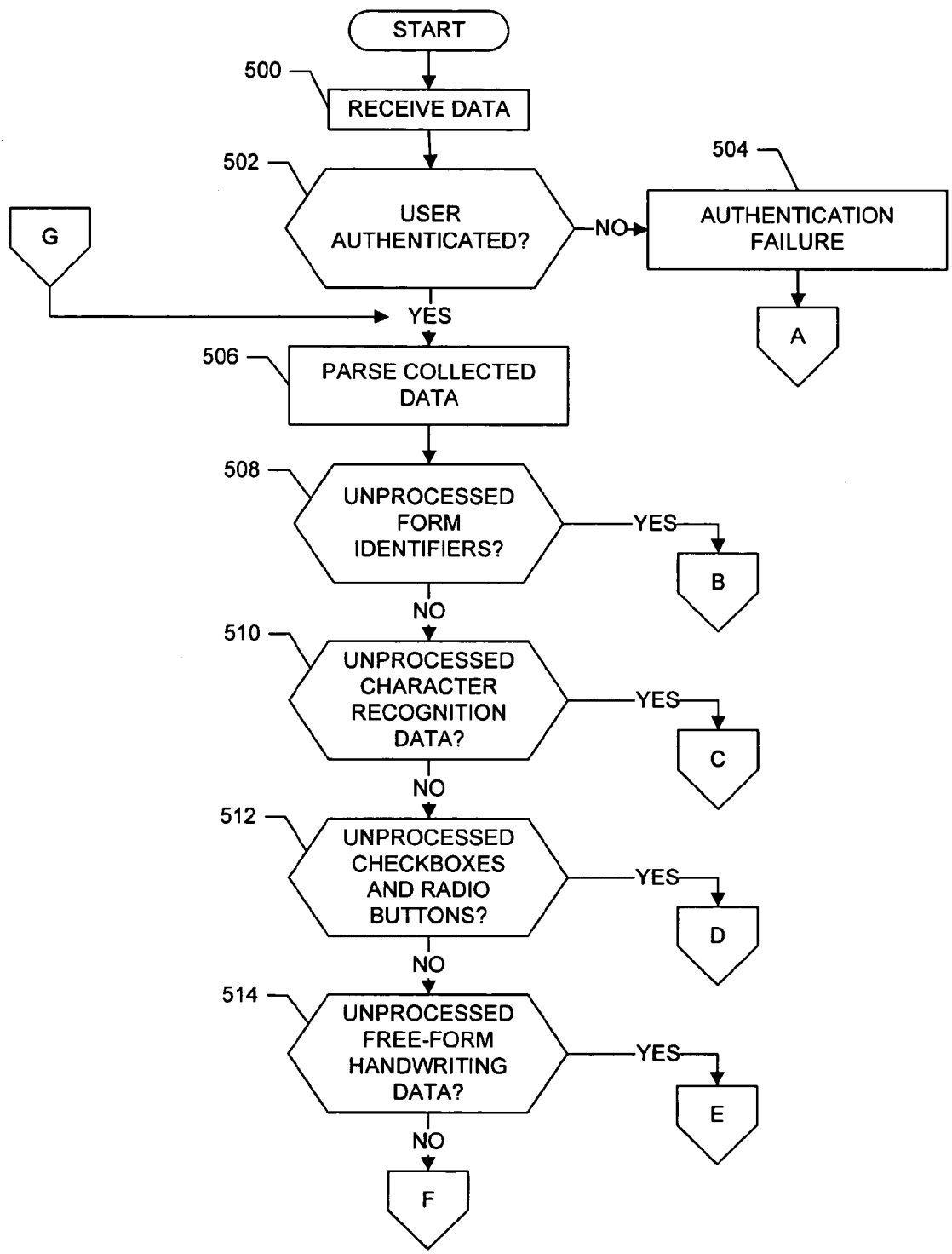
Figure 16B:
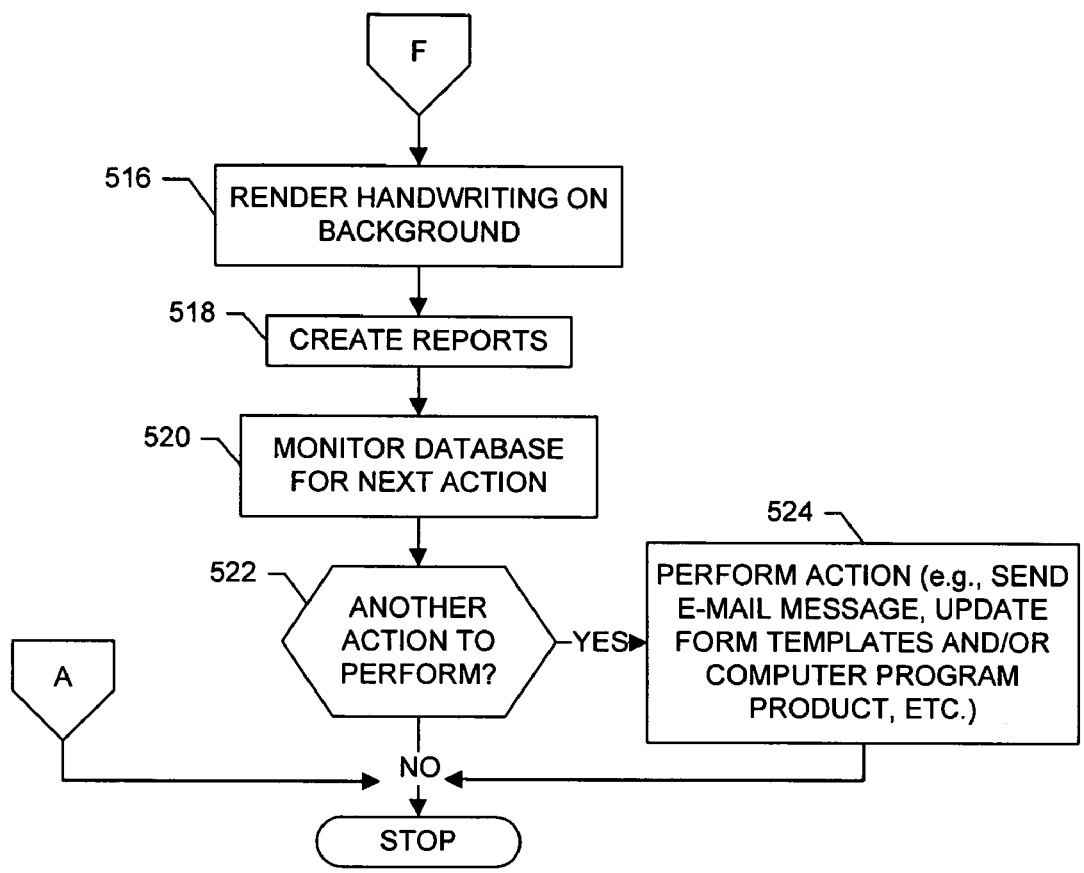
Figure 16C:
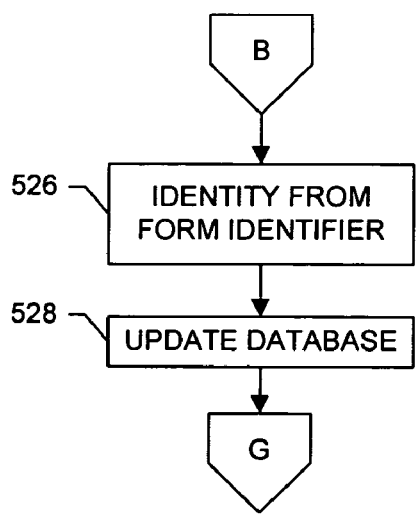
Figure 16D:
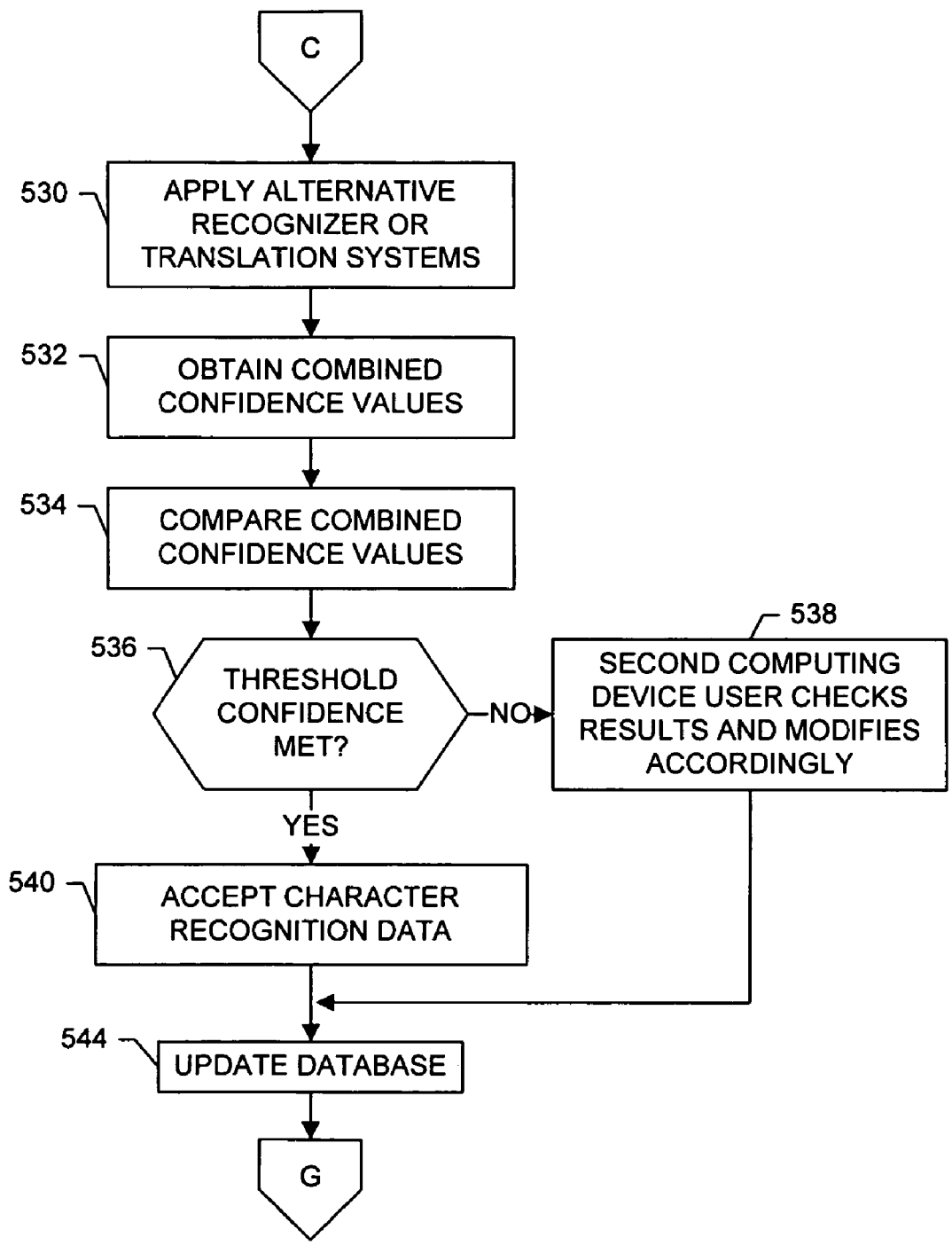

Referring to FIG. 16c, the third computing arrangement 400 uses the form identifiers to identify the form within the database 450 associated with the data, including the associated field locations, as shown in block 526. With the character recognition data, the third computing arrangement can verify the character recognition results by applying alternative on-line handwriting recognition or translation systems to the handwriting input for character recognition, as shown in block 530 of FIG. 16d. In addition, or in the alternative, the third computing arrangement or devices may apply multiple raster image based character recognition systems. In this regard, the third computing arrangement renders the original handwriting input for character recognition, such as by decompressing the representation in a similar manner to the free-form handwriting input, discussed below. Then, the third computing arrangement applies the alternative on-line and/or raster image based handwriting recognition or translation systems to translate the handwriting input obtain alternative results and associated confidence values, as such are known to those skilled in the art.

Similar to the computer program product of the second computing arrangement (e.g., digital pen 12 or computing system 14), the alternative on-line and/or raster image based handwriting recognition or translation systems can translate the handwriting input into one or more alternative text representations of each character and/or word, with each representation having an associated confidence value. For each character or word of the handwriting input, the third computing arrangement can then combine the confidence values associated with the alternative text representations of each character or word from the various recognizers or translation systems with the confidence values associated with the text representations from the second computing arrangement, as shown in block 532 of FIG. 16d. The combined confidence values for each text representation are then compared to determine the text representation with the highest confidence value, as shown in block 534. And if the highest confidence value meets a predefined threshold, the third computing arrangement may accept the text representation, as shown in blocks 536 and 540. Otherwise, a user associated with the third computing arrangement may verify the result, such as by human inspection, and modify the data accordingly, as shown in block 538.

For example, presume the second computing arrangement 390 recognized a particular handwriting input as representing the letter "O" with a confidence value of 14, and alternatively recognized the handwriting input as representing the letter "Q" with a confidence value of 8. Also, presume the third computing arrangement 400 applied a single alternative handwriting translation system, which recognized the same handwriting input as representing the letter "O" with a confidence value of 94, and alternatively as representing the letter "C" with a confidence value of 4. To obtain a combined confidence value for each character, the third computing arrangement combines all the confidence values associated with the respective recognized character to obtain a combined confidence value of 108 associated with "O," a combined confidence value of 8 associated with "Q" and a combined confidence value of 4 associated with C. Based upon a comparison of the overall confidence values of the recognized characters, "O" is determined to be the text representation for the handwriting input having the highest confidence value. And if the predefined threshold is below 108, then "O" is accepted as the text representation for the handwriting input.

Figure 16E:
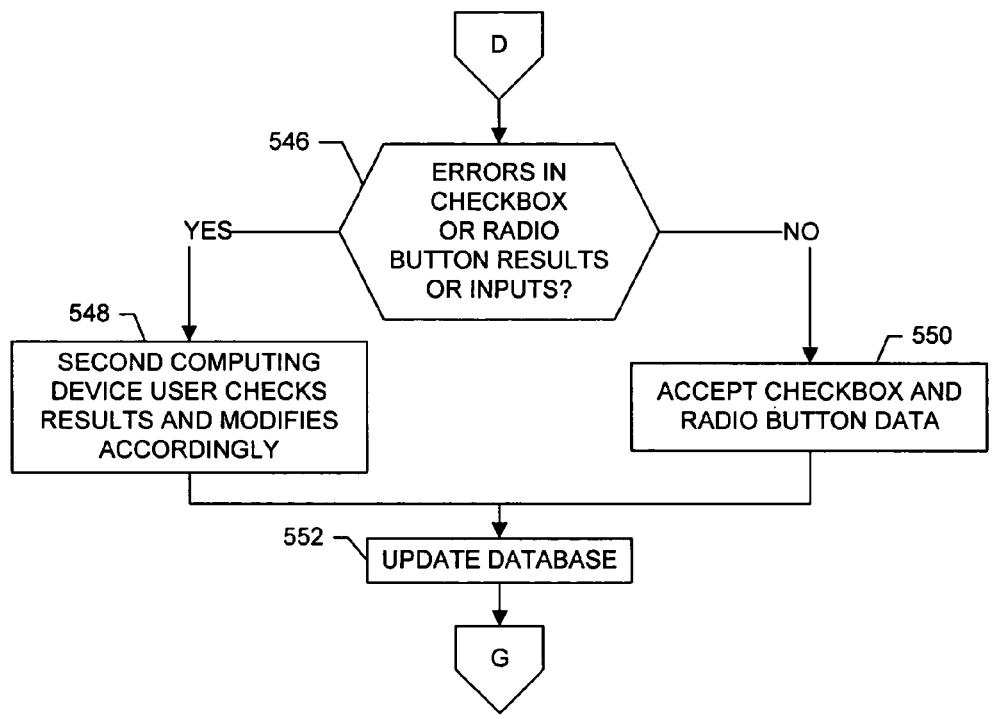
Figure 16F:
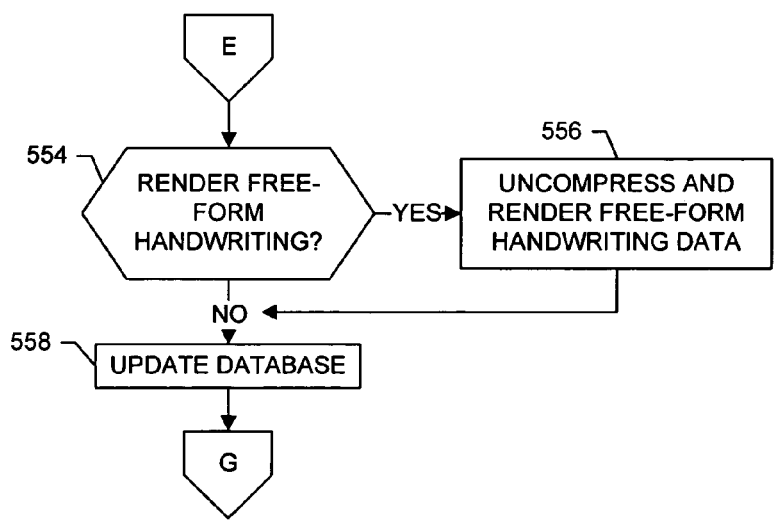

Referring to FIG. 16e with the selected checkboxes and radio buttons, the third computing arrangement 400 can verify and/or facilitate verification of the results. In this regard, the third computing arrangement can also include a set of business rules associated with particular form definitions to check the selected checkboxes and radio buttons for violations of such rules, such as inconsistency, incompleteness, inaccuracy of the data, data out of allowed range, and/or multiple choices made in any field, extra marks or marks outside of checkboxes, as shown in block 546. Additionally, or alternatively, the third computing arrangement can facilitate verification by providing a display including the text boxes, selected checkboxes and/or radio buttons such that the display of the text boxes, selected checkboxes and/or radio buttons can be checked for errors, such as by a user of the third computing arrangement. If errors exist, the third computing arrangement may notify the third computing arrangement user who may, in turn, verify the error, such as by human inspection, and adjust the data accordingly, as shown in block 548. As shown in FIG. 16f, with the compressed free-form handwriting input, the third computing arrangement can uncompress or otherwise process the free-form handwriting input to render the original handwriting input if so desired, as shown in blocks 554 and 556. Such a method for uncompressing the handwriting input is provided in U.S. Pat. No. 6,741, 749. Additionally, or alternatively, the third computing arrangement can store the compressed free-form handwriting input without uncompressing or otherwise processing the free-form handwriting input, such as when the third computing arrangement updates the database without first rendering the original handwriting input.

In addition to the handwritten information, packaged data from the second computing arrangement 390 can include additional data related to or associated with the handwritten information. As such, according to one aspect of the present invention, the third computing arrangement 400 can identify the additional data that relates to or is associated with the handwritten information. In this regard, the user of the second computing arrangement can provide the third computing arrangement with instructions, either concurrent with the transmission of the packaged data or at some time prior to the transmission of the packaged data. These instructions would identify the additional data to be included with the handwritten information. Alternatively, the third computing arrangement or some other component of the system can include prestored instructions indicating the additional data that is to be provided. For example, the prestored instructions may indicate that all messages to a particular recipient should include a predefined letterhead or background image and should further include additional text that has also been previously stored.

As such, in instances in which the third computing arrangement 400 determines that additional data relates to or is associated with the handwritten information and is to be included in the message transmitted to the intended recipient, the third computing arrangement can create a composite, such as a composite image, message, record or file, including both the handwritten information and the additional data. In one embodiment, the third computing arrangement can then create a composite with both the image of the handwritten information and the additional data included, albeit separately.

In some embodiments, the handwritten information is desirably superimposed upon the additional data, such as in instances in which the additional data is letterhead, stationery or some other background image. In these embodiments, the third computing arrangement 400 can overlay the handwritten information upon the additional data in such a manner that in those locations at which the handwritten information overlaps the additional data, the additional data is to be treated as being transparent such that the handwritten information will appear to be overlaid upon the additional data, as shown in block 516 of FIG. 16b. By relying upon the third computing arrangement of either embodiment to associate the handwritten information and the additional data, the second computing arrangement 390 need not store the additional data and need not transmit the additional data at or near the time at which the packaged data is transmitted to the third computing arrangement, if at all, thereby conserving both the memory of the second computing arrangement and the bandwidth required to transmit the packaged data between the second and third computing arrangements. Further details of processing the handwritten information and additional data can be found in U.S. Pat. No. 6,798,907, entitled: System, Computer Software Product and Method for Transmitting and Processing Handwritten Data, issued Sep. 28, 2004, assigned to Advanced Digital Systems, Inc., and hereby incorporated herein by reference in its entirety.

After the third computing arrangement 400 processes the packaged data, the third computing arrangement will update one or more databases 450 with the data using any of a number of standard Application Programming Interfaces (APIs), including Open Database Connectivity (ODBC), as shown in blocks 528, 544, 552 and 558 of FIGS. 16*c*, 12*d*, 12*e* and 12*f*, respectively. Additionally, as shown in FIG. 16*b*, the third computing arrangement can create reports based upon the data, and can include the data in reports incorporating data previously processed from the same form, such as a running report of several entries in a particular form or form identifier, as shown in block 518. The third computing arrangement can also monitor the database(s) and/or take a next action step resulting from updating the database, such as send an e-mail message containing the processed data, as shown in blocks 520, 522 and 524.

As indicated above, in addition to or in lieu of associating the user input with a desired form by means of a form identifier, user input can be associated with one or more other objects by means of respective identifiers associated with those objects. For example, the pen-enabled computing arrangement can be adapted to associate user input with one or more database records, entries or the like based upon sensing identifiers associated with those objects. In such instances, the pen-enabled computing arrangement 10 may or may not interact with a preprinted form. In lieu of a preprinted form, then, the pen enabled computing arrangement may directly interact with a handwriting capture interface 20, or may interact with the handwriting capture interface by means of a writing surface 18 embodied by blank paper or paper having information related to a respective object preprinted thereon.

As also explained above, user input can be associated with an object by means of an identifier associated with that object. It should be understood, however, that the user input can similarly be associated with an object by means of more than one identifier associated with that object, or be associated with more than one object by means of one or more identifiers associated with those objects. For example, presume that a database record (i.e., object) has an associated record identifier, and that the database record can store user input related to one or more of three forms (i.e., objects) that each have an associated identifier. In such an instance, user input may be associated with the database record and/or one or more of the three forms. To this end, a preprinted form may include more than one identification area, one for sensing the record identifier and another for sensing a form identifier.

In one advantageous embodiment, portions of the system and method of the present invention, such as portions of the digital pen 12 and computing system 14 include a computer program product 28. The computer program product includes a computer-readable storage medium, such as the non-volatile storage medium, and computer-readable program code portions, such as a series of computer instructions, embodied in the computer-readable storage medium for receiving the handwritten data and associated data and for subsequently processing and transmitting the handwritten data as described hereinabove. Typically, the computer program is stored by the processing element or a related memory device, such as the non-volatile storage device 26 as depicted in FIG. 2.

In this regard, FIGS. 1, 2, 7, 8, 11*a*, 11*b*, 15 and 16*a*-16*f* are block diagram, flowchart and control flow illustrations of methods, systems and program products according to the invention. It will be understood that each block or step of the block diagram, flowchart and control flow illustrations, and combinations of blocks in the block diagram, flowchart and control flow illustrations, can be implemented by computer program instructions. These computer program instructions may be loaded onto a computer or other programmable apparatus to produce a machine, such that the instructions which execute on the computer or other programmable apparatus create means for implementing the functions specified in the block diagram, flowchart or control flow block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the block diagram, flowchart or control flow block(s) or step(s). The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the block diagram, flowchart or control flow block(s) or step(s).

Accordingly, blocks or steps of the block diagram, flowchart or control flow illustrations support combinations of means for performing the specified functions, combinations of steps for performing the specified functions and program instruction means for performing the specified functions. It will also be understood that each block or step of the block diagram, flowchart or control flow illustrations, and combinations of blocks or steps in the block diagram, flowchart or control flow illustrations, can be implemented by special purpose hardware-based computer systems which perform the specified functions or steps, or combinations of special purpose hardware and computer instructions.

Therefore, the system, computer program product and method of embodiments of the present invention prompt a user to operate a pen-enabled computing arrangement to sense an identifier (e.g., form identifier) associated with an object (e.g., form), or otherwise automatically sense such an identifier. By providing a prompt or automatically sensing the identifier, embodiments of the present invention facilitate proper operation of the pen-enabled computing arrangement to sense or otherwise identify an object, such as by means of an associated identifier, before capturing handwriting input to associate with the object. In addition, embodiments of the present invention provide a number of different means for sensing the identifier of an object including, for example, by means of capturing initial electronic handwriting input representative of the identifier. In such instances, to account for instances of sensing an unknown and/or improper identifier, embodiments of the present invention also provide for triggered verification of such an identifier, thereby facilitating correction of the identifier.

In addition, embodiments of the present invention provide for interaction with printed paper that includes the identifier. In such instances, the printed paper can be generated by associating a number of object elements (e.g., form elements) with one another, including associating the identifier with the object and, if so desired, associating the identifier with a pattern from which a position of a writing stylus can be determined. The associated object elements, representations of the associated object elements and/or information related to the associated object elements can then be printed on a piece of paper, the resulting printed paper including the identifier. In this manner, the same pattern can be associated with more than one identifier, and thus more than one object.

Further, embodiments of the present invention provide feedback (e.g., aural, vibration and/or visual feedback) that facilitate proper operation of the pen-enabled computing arrangement by facilitating the user's awareness of improper operation of the pen-enabled computing arrangement such that the user can correct any errors resulting in the improper operation. Also, the present invention provides for verification of the handwriting input at the point of capture or after capture, such as by applying business rules to the handwriting input to ensure consistent, logical and complete capture and subsequent processing of the handwriting input. The present invention also includes performing character recognition multiple times on the handwriting input to thereby verify character recognition performed at the point of capture to provide higher accuracy of the character recognition results than performing either character recognition independent of the other. Additionally, the present invention processes handwriting input captured on paper, screen or other writing medium received into fields of an electronic form according to a form definition to avoid noise introduced during scanning and/or faxing of paper forms, as in conventional systems.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method of capturing data from an input received by a handwriting capture device, the method comprising:
   receiving printed paper including an identifier associated with an object, the printed paper having been prepared by:
      selecting a plurality of object elements, the selected object elements including an identifier independent of an object;
      associating the selected object elements with one another, including associating the identifier with the object; and
      printing, on a piece of paper, at least one of at least one associated object element, a representation of at least one associated object element or information related to at least one associated object element, wherein the resulting printed paper includes the identifier printed thereon, the identifier including a modulus number with a check digit encoded within a pattern, and wherein the resulting printed paper is received;
   sensing the identifier from the printed paper, including sensing the check digit of the identifier based upon the pattern encoding the check digit;
   determining if the sensed identifier is known and proper based upon the sensed check digit;
   capturing an electronic handwriting input based upon a position of the writing stylus with respect to the printed paper; and
   associating the electronic handwriting input with the sensed identifier to thereby associate the electronic handwriting input with the object associated with the identifier.

2. A method according to claim 1, wherein selecting a plurality of object elements comprises selecting a plurality of object elements further including a pattern from which a position of the writing stylus is capable of being determined, and
   wherein associating the selected object elements with one another includes associating the pattern with the identifier.

3. A method according to claim 2, wherein receiving printed paper comprises receiving a plurality of pieces of printed paper,
   wherein selecting a plurality of object elements for each printed paper includes selecting an identifier unique from the identifier selected for the other printed papers, and selecting a pattern the same as the pattern selected for at least one of the other printed papers, and
   wherein printing on each piece of printed paper includes printing, on a piece of paper, the associated identifier and pattern.

4. A method according to claim 1, wherein sensing the identifier includes prompting operation of the device to sense the identifier associated with an object, wherein prompting operation comprises controlling vibration of a writing stylus to thereby prompt a user to operate the device to sense the identifier, operation of the device being prompted before sensing the identifier.

5. A method according to claim 4, wherein the identifier is encoded within a barcode, and wherein prompting operation of the device comprises prompting operation of the device after receiving input other than a scanned barcode, and before sensing the identifier.

6. A method according to claim 4, wherein prompting operation of the device comprises prompting operation of the device if a predetermined amount of time passes before sensing the identifier.

7. A method according to claim 1, wherein sensing the identifier includes:
   capturing initial electronic handwriting input corresponding to the identifier;
   converting the initial electronic handwriting input into a text representation of the initial electronic handwriting input; and
   sensing the identifier based upon the text representation of the initial electronic handwriting input.

8. A method according to claim 7 further comprising:
   triggering verification of the identifier when the sensed identifier is at least one of unknown or improper, wherein triggering verification includes presenting at least a portion of the sensed identifier; and
   receiving at least a portion of the identifier based upon the presented portion of the sensed identifier such that the sensed identifier including the received portion is at least one of known or proper.

9. A method according to claim 1, wherein the identifier comprises a modulus number including a check digit, and wherein the method further comprises:
   determining if the sensed identifier is known and proper based upon the sensed check digit; and
   triggering verification of the identifier when the sensed identifier is at least one of unknown or improper.

10. A method according to claim 1, wherein the identifier is encoded within a radio frequency identification (RFID) tag, and wherein sensing the identifier comprises reading the identifier from the RFID tag.

11. A method according to claim 1, wherein the object comprises a database record, and the method further comprises storing at least one of the electronic handwriting input or a representation of the electronic handwriting input in the associated database record.

12. A method according to claim 1, wherein sensing the identifier comprises:
   imaging at least a portion of the object including the identifier such that the image of the respective portion of the object includes the identifier;

converting the image of the identifier into a machine-readable form; and sensing the identifier based upon the machine-readable form of the identifier.

13. A method according to claim 12, wherein at least a portion of the object is imaged with a camera associated with a writing stylus, and wherein imaging at least a portion of the object comprises imaging at least a portion of the object in response to bringing the writing stylus into proximate contact with the object.

14. A method according to claim 12, wherein the identifier is positioned relative to an identifiable portion of the object, wherein imaging at least a portion of the object comprises imaging at least a portion of the object such that the image of the respective portion of the object further includes the identifiable portion, wherein sensing the identifier further comprises:

segmenting the identifier within the image based upon the identifiable portion of the object and a location of the identifier relative to the identifiable portion, and wherein converting the image comprises converting the image based upon the segmented identifier.

15. A method according to claim 1, wherein receiving printed paper includes receiving a printed paper having been prepared by further:

printing a reprint of the identifier associated with the object on printed paper including the identifier printed thereon; and inspecting the resulting printed paper including the identifier and the reprint, inspecting the printed paper including identifying one of a match and a mismatch between the reprint and the printed identifier.

16. A system comprising:

a first computing arrangement programmed to prepare printed paper including an identifier associated with an object, the first computing arrangement being programmed to prepare the printed paper for use in capturing and processing data from an input received by a handwriting capture arrangement, wherein the first computing arrangement comprises a first processor programmed to select or receive selection of a plurality of object elements, the selected object elements including an identifier independent of an object, wherein the first processor is also programmed to associate the selected object elements with one another, including being programmed to associate the identifier with the object, and direct a printer to print, on a piece of paper, at least one of at least one associated object element, a representation of at least one associated object element or information related to at least one associated object element, wherein the resulting printed paper includes the identifier printed thereon, the identifier including a modulus number with a check digit encoded within a pattern; and a pen-enabled computing arrangement programmed to interact with the printed paper prepared by the first computing arrangement, wherein the pen-enabled computing arrangement comprises at least one second processor in communication with a handwriting capture interface and programmed to sense the identifier, and wherein the second processor is further programmed to sense the check digit of the identifier based upon the pattern encoding the check digit, and thereafter determine if the sensed identifier is known and proper based upon the sensed check digit.

17. A system according to claim 16, wherein the first processor is programmed to select or receive selection of a plurality of object elements further including a pattern from which a position of the writing stylus is determinable, and wherein the first processor is programmed to further associate the pattern with the identifier.

18. A system according to claim 17, wherein the first computing arrangement is programmed to prepare a plurality of pieces of printed paper, wherein the first processor is programmed to select or receive selection of, for each printed paper, an identifier unique from the identifier selected for the other printed papers, and select or receive selection of a pattern the same as the pattern selected for at least one of the other printed papers, and wherein the first processor is programmed to direct the printer to print, on each piece of printed paper, the associated identifier and pattern.

19. A system according to claim 16, wherein the pen-enabled computing device further comprises the handwriting capture interface, the handwriting capture interface being programmed to capture an electronic handwriting input based upon a position of the writing stylus with respect to the printed paper, wherein the second processor being programmed to sense the identifier includes being programmed to:

control vibration of the writing stylus to thereby prompt a user to operate the arrangement to sense the identifier; or automatically sense the identifier independent of user operation of the arrangement to sense the identifier, and wherein the second processor is thereafter programmed to sense the identifier from the printed paper and associate the electronic handwriting input with the sensed identifier to thereby associate the electronic handwriting input with the object associated with the identifier.

20. A system according to claim 19, wherein the identifier is encoded within a barcode, and wherein the second processor is programmed to prompt the user after receiving input other than a scanned barcode, and before sensing the identifier.

21. A system according to claim 19, wherein the second processor is programmed to prompt the user if a predetermined amount of time passes before sensing the identifier.

22. A system according to claim 19, wherein the handwriting capture interface is programmed to capture initial electronic handwriting input corresponding to the identifier, wherein the second processor is programmed to convert the initial electronic handwriting input into a text representation of the initial electronic handwriting input, and thereafter sense the identifier based upon the text representation of the initial electronic handwriting input.

23. A system according to claim 22, wherein the second processor is further programmed to trigger verification of the identifier when the sensed identifier is at least one of unknown or improper, wherein the pen-enabled computing arrangement further comprises:

a display in communication with the second processor, wherein the second processor is programmed to direct the display to present at least a portion of the sensed identifier when triggering verification of the identifier, and wherein the second processor is programmed to receive at least a portion of the identifier based upon the presented portion of the sensed identifier such that the sensed identifier including the received portion is at least one of known or proper.

24. A system according to claim 16, wherein the identifier comprises a modulus number including a check digit, wherein the second processor is further programmed to determine if the sensed identifier is known and proper based upon the sensed check digit, and trigger verification of the identifier when the sensed identifier is at least one of unknown or improper.

25. A system according to claim 16, wherein the identifier is encoded within a radio frequency (RF) identification (RFID) tag, wherein the pen-enabled computing arrangement further comprises an RF interrogator in communication with the second processor, and wherein the second processor is programmed to sense the identifier by reading the identifier from the RFID tag by means of the RF interrogator.

26. A system according to claim 16, wherein the object comprises a database record, and wherein the second processor is further programmed to facilitate storage of at least one of the electronic handwriting input or a representation of the electronic handwriting input in the associated database record.

27. A system according to claim 16, wherein the pen-enabled computing arrangement further comprises a camera programmed to image at least a portion of the object including the identifier such that the image of the respective portion of the object includes the identifier, wherein the second processor is programmed to automatically sense the identifier including being programmed to direct the camera to image at least a portion of the object including the identifier, convert the image of the identifier into a machine-readable form, and thereafter sense the identifier based upon the machine-readable form of the identifier.

28. A system according to claim 27, wherein the camera is associated with the writing stylus, and wherein the camera is programmed to image at least a portion of the object in response to the writing stylus being brought into proximate contact with the object.

29. A system according to claim 27, wherein the identifier is positioned relative to an identifiable portion of the object, wherein the camera is programmed to image at least a portion of the object such that the image of the respective portion of the object further includes the identifiable portion, wherein the second processor is programmed to sense the identifier including being programmed to segment the identifier within the image based upon the identifiable portion of the object and a location of the identifier relative to the identifiable portion, and convert the image based upon the segmented identifier.

30. A system according to claim 16, wherein the first processor is programmed to direct the printer to further print a reprint of the identifier associated with the object on printed paper including the identifier printed thereon, the first computing arrangement thereby being programmed to facilitate inspection of the resulting printed paper, inspection of the resulting printed paper including identifying a match or a mismatch between the reprint and the printed identifier.

* * * * *

UNITED STATES PATENT AND TRADEMARK OFFICE
CERTIFICATE OF CORRECTION

PATENT NO. : 7,639,876 B2  Page 1 of 1
APPLICATION NO. : 11/036534
DATED : December 29, 2009
INVENTOR(S) : Clary et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1092 days.

Signed and Sealed this

Ninth Day of November, 2010

David J. Kappos
*Director of the United States Patent and Trademark Office*